(12) United States Patent
     Mui

(10) Patent No.: US 10,469,807 B2
(45) Date of Patent: Nov. 5, 2019

(54) COLOR MEASUREMENT AND CALIBRATION

(71) Applicant: Color Match, LLC, Warrenton, VA (US)

(72) Inventor: Peter H. Mui, Warrenton, VA (US)

(73) Assignee: COLOR MATCH, LLC, Warrenton, VA (US)

( * ) Notice: Subject to any disclaimer, the term of this patent is extended or adjusted under 35 U.S.C. 154(b) by 0 days.

(21) Appl. No.: 15/861,683

(22) Filed: Jan. 4, 2018

(65) Prior Publication Data

US 2018/0146175 A1 May 24, 2018

Related U.S. Application Data

(63) Continuation-in-part of application No. 15/452,282, filed on Mar. 7, 2017, which is a continuation of application No. 14/484,241, filed on Sep. 11, 2014, now Pat. No. 9,794,528.

(60) Provisional application No. 61/876,737, filed on Sep. 11, 2013.

(51) Int. Cl.
| | |
|---|---|
| *G06K 9/00* | (2006.01) |
| *H04N 9/04* | (2006.01) |
| *G01J 3/52* | (2006.01) |
| *G01J 3/46* | (2006.01) |
| *H04N 17/00* | (2006.01) |

(52) U.S. Cl.
CPC ............... *H04N 9/04* (2013.01); *G01J 3/462* (2013.01); *G01J 3/463* (2013.01); *G01J 3/52* (2013.01); *G01J 3/522* (2013.01); *H04N 17/002* (2013.01)

(58) Field of Classification Search
CPC ......... G01J 3/522; G06K 9/6202; G06T 7/90; G06T 2207/10024; H04N 1/6008; H04N 1/6033; H04N 9/077
See application file for complete search history.

(56) References Cited

U.S. PATENT DOCUMENTS

| | | | |
|---|---|---|---|
| 5,751,450 A | 5/1998 | Robinson | |
| 5,850,472 A * | 12/1998 | Alston | ............ G01J 3/10 |
| | | | 382/162 |
| 6,301,044 B1 | 10/2001 | Huber | |
| 6,628,829 B1 | 9/2003 | Chasen | |
| 6,757,428 B1 | 6/2004 | Lin | |
| 6,766,050 B1 * | 7/2004 | Saikawa | ............ H04N 1/60 |
| | | | 382/162 |
| 6,923,543 B2 | 8/2005 | Huber | |
| 6,924,817 B2 | 8/2005 | Rice et al. | |
| 6,959,111 B2 | 10/2005 | Hirayama et al. | |
| 6,963,425 B1 | 11/2005 | Nair | |
| 6,975,391 B1 * | 12/2005 | Asano | ............ G01N 21/8806 |
| | | | 356/237.1 |
| 8,009,884 B2 | 8/2011 | Chio | |
| 8,229,210 B2 | 7/2012 | Rao | |

(Continued)

*Primary Examiner* — Aaron W Carter
(74) *Attorney, Agent, or Firm* — Symbus Law Group, LLC; Clifford D. Hyra

(57) ABSTRACT

Embodiments described herein disclose a color measurement device and method for use with cameras or other imaging devices. The color measurement device may be configured to determine many different colors via a commonly owned device. Embodiments utilize sinusoidal grayscale rings to determine an exact color match of an unknown color, even if there is perspective distortion of an obtained image.

47 Claims, 10 Drawing Sheets

(56) References Cited

U.S. PATENT DOCUMENTS

| | | |
|---|---|---|
| 8,376,600 B2 | 2/2013 | Bartol |
| 8,693,768 B1 * | 4/2014 | LaForgia ............ A45D 44/005 222/1 |
| 8,913,824 B2 | 12/2014 | Li |
| 9,146,012 B2 | 9/2015 | Bartol |
| 9,206,672 B2 | 12/2015 | Cooley et al. |
| 9,794,528 B2 | 10/2017 | Mui |
| 2002/0021439 A1 | 2/2002 | Priestley et al. |
| 2002/0041705 A1 * | 4/2002 | Lin ...................... G06K 9/3241 382/165 |
| 2002/0102018 A1 | 8/2002 | Lin et al. |
| 2003/0083850 A1 | 5/2003 | Schmidt et al. |
| 2004/0078299 A1 | 4/2004 | Down-Logan et al. |
| 2007/0242877 A1 | 10/2007 | Peters et al. |
| 2008/0008370 A1 | 1/2008 | Chio |
| 2012/0045121 A1 | 2/2012 | Youngman et al. |
| 2012/0099788 A1 | 4/2012 | Bhatti et al. |
| 2012/0236144 A1 | 9/2012 | Rao |
| 2012/0288195 A1 * | 11/2012 | Lings .................... G01J 3/0264 382/167 |
| 2013/0022264 A1 | 1/2013 | Atsmon |
| 2013/0162840 A1 * | 6/2013 | Bengtsson ................ G01J 3/52 348/188 |
| 2013/0300793 A1 * | 11/2013 | Klein Koerkamp ... B41J 2/2056 347/15 |
| 2014/0285806 A1 * | 9/2014 | Haas ....................... G01J 3/522 356/406 |
| 2015/0070510 A1 | 3/2015 | Mui |
| 2015/0359459 A1 * | 12/2015 | Taylor .................. A61B 5/1034 600/477 |
| 2017/0180725 A1 * | 6/2017 | Mui ........................ H04N 9/04 |
| 2017/0270679 A1 * | 9/2017 | Koven .................. G01J 3/0264 |
| 2017/0272741 A1 * | 9/2017 | Maltz .................. H04N 17/002 |
| 2018/0146175 A1 * | 5/2018 | Mui ........................ G01J 3/522 |

\* cited by examiner

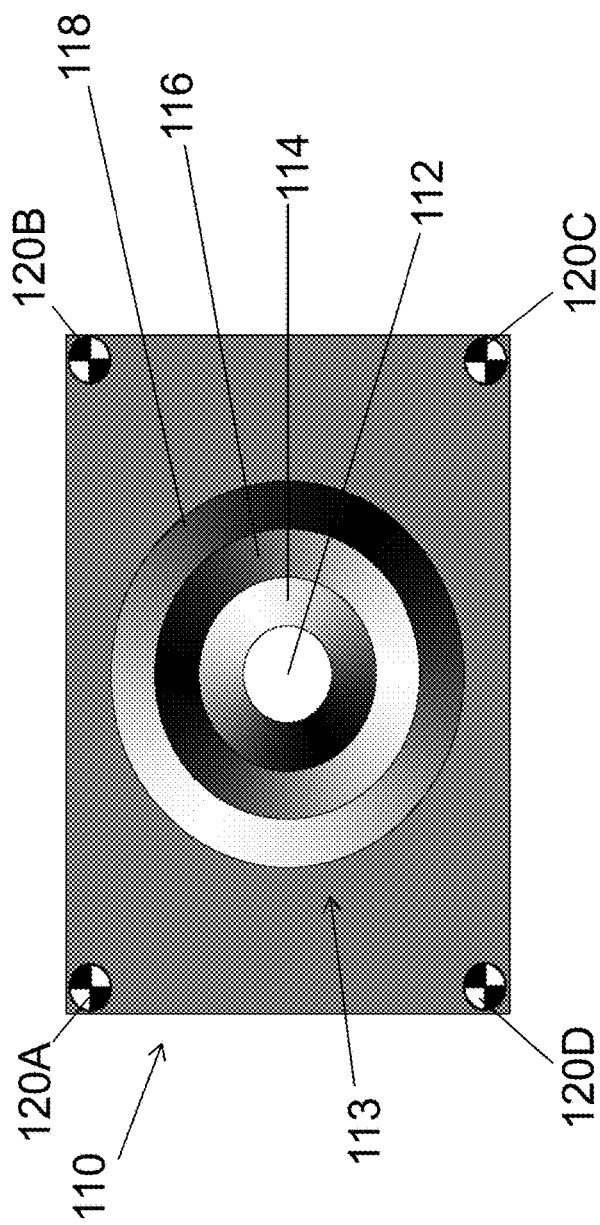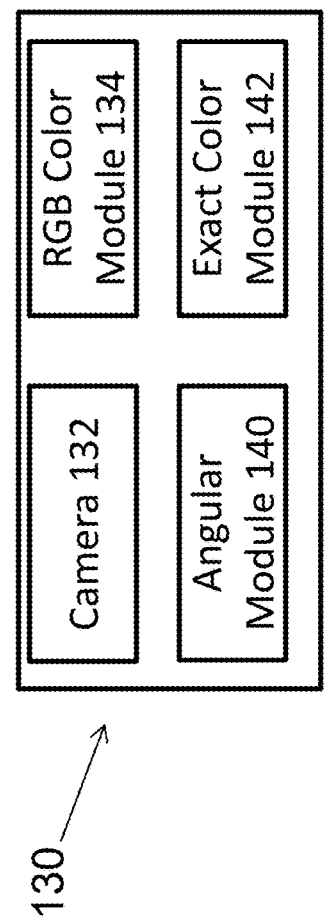
FIGURE 1

COLOR MEASUREMENT AND CALIBRATION

This application is a continuation-in-part of U.S. application Ser. No. 15/452,282 filed Mar. 7, 2017, which is a continuation of U.S. application Ser. No. 14/484,241 filed Sep. 11, 2014, which claims priority to U.S. Provisional Application No. 61/876,737, filed Sep. 11, 2013, each of which is hereby incorporated by reference in its entirety.

TECHNICAL FIELD

This disclosure relates generally to systems and methods for color measurement and calibration. Specifically, this disclosure relates to systems and methods for measuring (e.g., identifying, matching, or otherwise analyzing) colors of an unknown color sample based on measurements utilizing a template card.

BACKGROUND

In certain situations, such as when repainting portions of a wall, an individual may wish to identify an existing unknown color, such as an existing paint color so that matching paint can be obtained. Systems that enable this process are called color matching systems.

Conventionally, a color matching system includes a standardized set of colors provided by a manufacturer that an individual visually compares to the unknown color in order to seek a match. However, such a system is often deficient because, even where a very large standardized set of colors is provided that may itself be unwieldy, an individual may not be able to determine a color within a standardized set that corresponds to the unknown color, or the match may be inexact, particularly if the paint has aged.

The use of a colorimeter to determine an unknown color is also known. However, known colorimeters are imprecise and economically impractical for an individual to purchase for personal use, such as for implementing a color scan to determine the paint color of a wall.

Cameras and imaging alone cannot be used to determine an unknown color. This is because gain varies from camera to camera, and lighting associated with capturing a given image is subject to infinite variation. In some conventional systems, an individual may utilize balance cards to calibrate the gain, the contrast, and the brightness of an imaging system. However, when utilizing balance cards to calibrate an imaging system for determining an image color, at least three such cards must be imaged in about the same setting and at about the same angle. This is a difficult task requiring precise diligence. In addition, even using three cards, accuracy is limited due to the fact that camera gain/response curves are not perfectly linear, generally resulting in unsatisfactory color matching.

Accordingly, needs exist for improved and efficient methods and systems for measuring colors.

SUMMARY

Embodiments disclosed herein provide systems and methods for measuring colors. In embodiments, a template card with certain markings may be utilized to determine an existing color. The template card may be utilized to determine a red, a green, and a blue color value of an unknown color from an image of the template card and the unknown color. Using the determined red, green, and blue color values, the unknown color may be identified or matched to an existing color or colors.

For true grays, red, blue, and green color intensities (or color values) are equal. Thus, when the intensity of a gray scale is discussed, it can be understood as a single value, which indicates that the red, blue, and green values of that gray scale are all that same value. For example, one (dark) gray has red, green, and blue intensities that are each 50, and is referred to as having an intensity of 50, while another (lighter) gray having an intensity of 200 would have red, green and blue color values of 200 (examples provided are for 8-bit color having 256 possible values for each color). Thus, finding the intensity of a gray color is equivalent to finding the red color value, blue color value, or green color value of the gray color.

In embodiments, the template card may include one or more full gray scale continuums, where the intensity along each continuum may be calculated based on geometric position. For example, a gray scale continuum may be a straight line across the template card, with intensity as a function of linear position along the line. Similarly, a gray scale continuum may be a ring or other shape with intensity as a function of polar angle from the center of the continuum. A full continuum increases accuracy by eliminating the need for linear interpolation. Knowing the true intensity at every point along the gray scale continuum allows the effect of imaging system distortion to be eliminated. Since such distortion affects the gray scales and the unknown color sample equally, the true color value of an unknown sample may be determined by matching a color value of the unknown color sample to the determined intensity at a point on the gray scale continuum, and then determining the true intensity at that point on the gray scale continuum. In this way the true color value of the unknown sample may be determined irrespective of the distortion present.

Furthermore, the use of a black and white scale may lower production costs.

Geometric markers may be used on the template card to correct for perspective distortion in the image. In some embodiments of the template card, it is critical to determine the geometric location of the matching point on the gray scale continuum so that the true intensity value can be determined using a known intensity function. Determining the geometric location may be difficult when the image is taken from an angle. Distinctive features at specified points on the template card can be used to correct for the perspective distortion. For example, corner quadratic wheels may be implemented to pinpoint the center of the template card as described below, regardless of the perspective distortion. In other embodiments, the corner quadratic wheels may be located at the midpoints of the side edges of a rectangular template.

In embodiments, a template card may include a center cut-out for viewing the unknown color, and three concentric rings, each of the concentric rings having 256 or more level gray scales (each level being a different shade or intensity of gray), wherein the gray scales may be modulated sinusoidally as a function of their angle in the polar coordinate. While other shapes may be used, concentric rings may allow multiple gray scale continuums to be placed in close proximity to the central cut-out through which the unknown color sample is visible, which may allow for simpler color value calculations. A central cut-out may allow for smaller color samples to be used and for simple geometric calculations. However, in some embodiments the cut-out may not be centrally located, or there may be no cut-out and the unknown color sample may be arranged adjacent to the template.

In embodiments, utilizing three concentric rings around a circular central cut-out may allow for polar angles of radial cross-sections of the concentric rings to be more easily determined when the center of the circular cut-out and intensity slice profiles of the three rings are known.

In embodiments, the inner and outer rings may be phase shifted by +120° and −120° with respect to the middle ring. This results in a known mathematical relationship between the three rings. Other phase shifts may be utilized, but may result in more complex mathematical relationships between the rings.

In embodiments, to determine the red, green, and blue color values of an unknown sample color, the template card with the center cut-out may be positioned over the unknown sample color. An imaging device or equivalent, such as a camera, may obtain an image of the template card superimposed on the unknown sample color. The imaging device may determine a true red value of the unknown color based on the intensity of the radial cross-section (known as a function of its angular coordinates) of at least one of the plurality of rings having an intensity in the image matching the determined red color value of the unknown color sample image.

In embodiments, the imaging device may determine a true green value of the unknown color based on the intensity of the radial cross-section of any or a combination of the plurality of rings which has in the image a determined green intensity matching the determined green color value of the unknown color sample image. The imaging device may determine a true blue value of the unknown color based on the intensity of the radial cross-section of any or a combination of the plurality of rings which has in the image a determined blue intensity matching the determined blue color value of the unknown color sample image.

In embodiments, a polar angle of a concentric ring radial cross-section may be determined using the determined intensities of the plurality of concentric rings and trigonometry. The polar angle may be used to calculate a true intensity of the concentric ring at that radial cross-section. Combining the determined red color value, green color value, and blue color value, the true color of the unknown color sample may be determined. The term "true color" as used herein means the RGB values for the unknown color as determined by the system and method described herein according to any one of the embodiments, and includes a margin of error that is acceptable for the intended use and application of the present invention.

A new system for determining a true color of an unknown color sample includes a template having a cut-out and a plurality of concentric rings around the cut-out, each of the concentric rings having offset gray scales modulated as a function of an angle of a polar coordinate. A trigonometric relationship exists between the gray scales of the plurality of concentric rings, for example each concentric ring may be phase shifted with respect to the other concentric rings. The template may be a card formed with paper (such as cardboard), plastic, and/or various other materials. The template in embodiments may take many shapes, although a thin template may be desirable to avoid shadow from the template falling on an unknown color sample behind or adjacent to the template. In embodiments, the template may be an electronic display. For example, the template may be a display on a mobile electronic device screen.

In embodiments the system may include a RGB color module and an angular module. The RGB color module may be configured to determine, in an image of the template over the unknown color sample, a first radial cross-section of one of the concentric rings having an intensity that matches a determined average red color value of the image of the unknown color sample and to determine a true average red color value of the unknown color sample based on an intensity profile of the one of the concentric rings and a polar angle of the first radial cross-section. The term "true average" as used herein means the average value for the unknown color or color component as the case may be, as determined by the system and method described herein according to any one of the embodiments, and includes a margin of error that is acceptable for the intended use and application of the present invention.

Any of the concentric rings may be used for matching a color value of the unknown color sample image. The angular module may be configured to determine the polar angle of the first radial cross-section. In embodiments, the polar angle of the first radial cross-section may be determined indirectly, by determining the polar angle of another radial cross-section of another of the concentric rings lying along the same radial segment as the first radial cross-section, for example if the polar angle is more easily calculated for that other concentric ring. For example, for a template with three concentric rings, the middle concentric ring may be used for polar angle determinations where the inner and outer concentric rings are phase shifted with respect to the middle concentric ring.

In embodiments the angular module may be configured to determine the polar angle of the first radial cross-section by comparing the intensity in the image of the first radial cross-section with an intensity in the image of a radial cross-section of another of the concentric rings along the same radial segment and utilizing the trigonometric relationship between the gray scales of the concentric rings. The comparison may be made with just one other concentric ring and corresponding radial cross-section or with two or more others. The radial segment may be constructed by determining a centroid of the cut-out and drawing a line from the centroid through the radial cross-section.

In embodiments the RGB color module may be further configured to determine, in the image of the template over the unknown color sample, a second radial cross-section of a second one of the concentric rings having an intensity that matches a determined average green color value of the image of the unknown color sample and to determine a true average green color value of the unknown color sample based on a ring intensity profile of the second one of the concentric rings and a polar angle of the second radial cross-section, and to determine, in the image of the template over the unknown color sample, a third radial cross-section of a third one of the concentric rings having an intensity that matches a determined average blue color value of the image of the unknown color sample and to determine a true average blue color value of the unknown color sample based on a ring intensity profile of the third one of the concentric rings and a polar angle of the third radial cross-section. The angular module may be configured to determine the polar angle of the second and third radial cross-sections.

In embodiments the system may also include an exact color module configured to determine the true color of the unknown color sample based on the true average red color value of the unknown color sample, the true average green color value of the unknown color sample, and the true average blue color value of the unknown color sample.

In embodiments each concentric ring may be phase shifted a given angle from each other concentric ring. For example, in an embodiment with three concentric rings, the second concentric ring may be phase shifted a first given angle from the first concentric ring and the third concentric ring may be phase shifted a second given angle from the second concentric ring. Each of these given angles may be for example 120°.

In embodiments the system may also include an image capturing device configured to obtain an image of the template over the unknown color sample.

In embodiments the template may include distinctive markings at known locations such that the center of the concentric rings can be determined from an image of the template using geometric relationships between the distinctive markings and the center of the concentric rings. For example, the template may be rectangular, the distinctive markings may be corner markings, and the center of the concentric rings may be at the center of the template, such that the center of the concentric rings in the image can be determined based on an intersection of a first line from a first of the corner markings diagonally to a third of the corner markings and a second line from a second of the corner markings diagonally to a fourth of the corner markings. Similarly, the template could be circular and the markings at 90-degree angles around the circumference. The center of the concentric rings may be used to determine the radial segment on which a radial cross-section lies (as the radial segment extends from the center and through the radial cross-section).

In embodiments the RGB module may also be configured to determine, in the image of the template over the unknown color sample, another radial cross-section of another of the concentric rings having an intensity that matches the determined average red color value of the image of the unknown color sample and to determine a second true average red color value of the unknown color sample based on a ring intensity profile of the another of the concentric rings and a polar angle of the another radial cross-section, and to determine a final true average red color value of the unknown color sample by calculating a weighted average of the true average red color value and the second true average red color value. For example, the first radial cross-section could be of the middle ring and the another radial cross-section of the inner or outer ring. Any ring may be used to determine the true average red (or other) color value of the unknown color sample, and by making the determination multiple times and averaging the results, certain sources of error may be reduced.

A new method for determining a true color of an unknown color sample includes obtaining an image, where the image includes the unknown color sample and a template having a cut-out and a plurality of concentric rings around the cut-out, each of the plurality of concentric rings having offset gray scales modulated as a function of an angle of a polar coordinate, where a trigonometric relationship exists between the gray scales of the plurality of concentric rings, determining a first radial cross-section of one of the concentric rings that matches a determined average red color value of the unknown color sample in the image, determining a polar angle of the first radial cross-section, and determining a true average red color value of the unknown color sample based on an intensity profile of the one of the concentric rings and the polar angle of the first radial cross-section.

The image need not necessarily contain the entire template, as long as it contains at least one concentric ring in addition to the unknown color sample. Additional concentric rings and/or markings for determining the center of the concentric ring(s) may also be desirable to have in the image. In embodiments, the image may be uploaded by a user over a computer network (e.g. the Internet) via a website, software application, or similar. An image acquisition module may be used to receive the image from the user and/or to analyze the image, for example to notify the user if the image lacks the template entirely or lacks any feature of the template (e.g. concentric rings or other gray-scale continuums, markings for center-finding, etc.). This may be done for example by comparing the obtained image with images of one or more templates stored in a database or other computer storage medium, using known image analysis methods.

In embodiments the method may also include positioning the cut-out of the template over the unknown color sample, and obtaining the image may include actuating an image-capturing device. For example, a camera may be used to take a picture of the template after placing it over the unknown color sample. The camera may be on a mobile electronic device. An app on a mobile electronic device or a website accessed via a browser on a mobile electronic device may prompt a user to take the picture, and may automatically process the image according to the methods steps described, or transmit it e.g. over a computer network to another location for processing.

In embodiments the polar angle of the first radial cross-section may be determined by comparing the intensity in the image of the first radial cross-section with an intensity in the image of a radial cross-section of another of the concentric rings along the same radial segment as the first radial cross-section and utilizing the trigonometric relationship between the gray scales of the concentric rings. Although the intensities in the image may not be the true intensities of the imaged colors, the sources of errors inherent in the image-taking process may apply relatively equally to different parts of the image (e.g. the unknown color sample and the gray scale continuums), leaving the relationship between the color values of the concentric rings/gray scale continuums intact. The term "true intensity" as used herein means the actual intensity for the imaged (unknown) color as determined by the system and method described herein according to any one of the embodiments, and includes a margin of error that is acceptable for the intended use and application of the present invention.

In embodiments the method may include determining, in the image, a second radial cross-section of a second one of the concentric rings having an intensity that matches a determined average green color value of the image of the unknown color sample and determining a true average green color value of the unknown color sample based on a ring intensity profile of the second one of the concentric rings and a polar angle of the second radial cross-section, and determining, in the image, a third radial cross-section of a third one of the concentric rings having an intensity that matches a determined average blue color value of the image of the unknown color sample and determining a true average blue color value of the unknown color sample based on a ring intensity profile of the third one of the concentric rings and a polar angle of the third radial cross-section, and determining the polar angle of the second and third radial cross-sections.

In embodiments the true color of the unknown color sample may be determined based on the true average red color value of the unknown color sample, the true average green color value of the unknown color sample, and the true average blue color value of the unknown color sample.

In embodiments the template may also have distinctive markings at known locations and the center of the concentric rings may be determined from the image using geometric relationships between the distinctive markings and the center, and the center of the concentric rings may be used to determine the radial segment on which a radial cross-section lies.

In embodiments the method may include determining, in the image, another radial cross-section of another of the concentric rings having an intensity that matches the determined average red color value of the image of the unknown color sample and determining a second true average red color value of the unknown color sample based on a ring intensity profile of the another of the concentric rings and a polar angle of the another radial cross-section, and determining a final true average red color value of the unknown color sample by calculating a weighted average of the true average red color value and the second true average red color value. This step may be repeated with any number of additional gray scale continuums (e.g. concentric rings of gray scales). Such processes may reduce the effect of image-capturing errors that apply unequally to different imaged areas.

A new color identification system may include a template comprising one or more full gray scale continuums, where the true intensity along each continuum is a function of geometric position on the template, an image obtaining device configured to obtain an image of an unknown color sample adjacent to the template, and color identification modules configured to determine geometric positions on the gray scale continuums in the image where their intensity matches determined red, green, and blue color values of the image of the unknown color sample, and to use the determined geometric positions to determine the true intensity of the gray scale continuum at each geometric position, and to use these true intensities to determine the color of the unknown color sample.

A new color identification method includes obtaining an image of an unknown color sample adjacent to a template comprising one or more full gray scale continuums, where the true intensity along each continuum is a function of geometric position on the template, determining geometric positions on the gray scale continuums in the image where intensity matches determined red, green, and blue color values of the image of the unknown color sample, determining true intensities of the gray scale continuums at the geometric positions based on the determined geometric positions and the relationship between geometric position and true intensity, and determining the color of the unknown color sample based on these true intensities.

For example, in an embodiment a linear gray scale continuum (where the intensity of the gray scale is a function of linear distance along this continuum) on a template is imaged next to an unknown color sample. A first geometric position on the image of the linear gray scale continuum having an intensity matching the average red color value of the image of the unknown color sample, a second geometric position on the image of the linear gray scale continuum having an intensity matching the average green color value of the image of the unknown color sample, and a third geometric position on the image of the linear gray scale continuum having an intensity matching the average blue color value of the image of the unknown color sample are determined using known image analysis techniques. The first, second and third geometric positions on the image are translated into first, second, and third linear distances along the gray scale continuum using e.g. known image analysis techniques, distinctive markings, etc. Then the first, second and third linear distances and the function of the true intensity of the gray scale continuum with respect to linear distance along the continuum are used to determine the true intensity of the gray scale continuum at each geometric position, corresponding to the true red color value, true green color value, and true blue color value, respectively, of the unknown color sample. Together, these true color values are used to determine the true color of the unknown color sample.

A new system for determining a color match includes a database storing color definitions, each having a unique RGB value, which may correspond to paint colors or shades of skintone for matching cosmetic makeups to skintones, a template card having at least one reference scale, a memory for storing pre-determined calibration RGB values corresponding to the at least one reference scale and a processor configured to receive a first image of the template card and color sample, process the first image and output a sample RGB value corresponding to the color sample and at least one reference scale RGB value, apply color correction to the sample RGB value based on a difference between the at least one reference scale RGB value and a corresponding calibration RGB value of the at least one reference scale to produce a color corrected sample RGB value, and compare the color corrected sample RGB value with the RGB values of the color definitions stored within the database to determine a color match.

The processor may be part of a smart phone or other mobile electronic device, and may also be configured to apply a predetermined least squares fitting function to the color corrected RGB value prior to comparing the color corrected sample RGB value with the RGB values of the color definitions stored within the database. Each of the color definitions may correspond to a color within the RGB color spectrum. Intensity on the reference scale may be a function of geometric position on the template card.

In embodiments, the system may also include a camera configured to capture the first image, which may be part of a smartphone or other mobile electronic device. The template card may include a substrate and a cut-out, where the color sample portion of the image is in the cut-out. The reference scale may include one or more modulated gray scale arranged on the substrate, for example a plurality of gray scales arranged on the substrate and modulated as a function of an angle of a polar coordinate. There may be three such gray scales, modulated as a function of an angle of a polar coordinate, each gray scale being offset by 120 degrees with respect to each of the other two gray scales. The reference scales may include a plurality of concentric rings arranged on the substrate around the cut-out, each of the concentric rings having offset gray scales modulated as a function of an angle of a polar coordinate, where there is a trigonometric relationship between the gray scales of the plurality of concentric rings, and may also include one or more reference colors arranged around the plurality of concentric rings. The reference colors may include a series of reference colors surrounding the plurality of concentric rings.

The template card may also have a plurality of distinctive markings readable by the processor as part of the first image and the processor may be configured to correct perspective distortion of the first image using the distinctive markings. The template card may also have a machine-readable code, such as a bar code, configured to provide the pre-determined calibration RGB values corresponding calibration RGB values of the at least one reference color and the predetermined least squares fitting function.

A new method for matching colors includes arranging a template card comprising at least one reference scale adjacent to a color sample of unknown color, obtaining a first image of the template card and the color sample, determining a sample RGB value of the color sample and at least one reference RGB value from the first image to produce a determined sample RGB value, applying color correction to the determined sample RGB value based on a difference between the at least one reference RGB value and corresponding calibration RGB values of the at least one reference scale to produce a color corrected sample RGB value, and comparing the color corrected sample RGB value with RGB values of a plurality of color definitions stored within a database to determine a color match. The method may also include applying a predetermined least squares fitting function to the color corrected RGB value prior to comparing the color corrected sample RGB value with the RGB values of the color definitions stored within the database. A camera may be actuated to obtain the first image.

In embodiments, the template card may include a substrate and a cut-out, and arranging the template card may include positioning the cut-out over the color sample. The reference scale may include one or more modulated gray scales arranged on the substrate, which may modulated as a function of an angle of a polar coordinate. For example, there may be three gray scales arranged on the substrate and modulated as a function of an angle of a polar coordinate, each the gray scale being offset by 120 degrees with respect to each of the other two gray scales. The reference scale may include a plurality of concentric rings arranged on the substrate around the cut-out, each of the concentric rings having offset gray scales modulated as a function of an angle of a polar coordinate, where there is a trigonometric relationship between the gray scales of the plurality of concentric rings. The reference scale may also include at least one reference color arranged around the plurality of concentric rings, for example a series of reference colors surrounding the plurality of concentric rings.

The template card may also include a plurality of distinctive markings and the method may also include correcting a perspective distortion of the first image using the distinctive markings. The camera and/or processor may be part of a smartphone. The color definitions may correspond to paint colors, or shades of skintone for matching cosmetic make-ups to skintones, and may each correspond to a color within the RGB color spectrum. Intensity on the reference scale may be a function of geometric position on the template card and determining a sample RGB value of the color sample from the first image may involve determining measured red, green and blue color values of the color sample and determining geometric positions on the template card where intensity on the reference scale matches each of the measured red, green and blue color values. The method may also include using a machine-readable code such as a bar code on the template card to obtain the calibration RGB values and the predetermined least squares fitting function.

A new system for color determination includes a database storing color definitions, each having a unique RGB value, one or more template cards, each having at least one reference scale and at least one reference color, and a processor configured to receive one or more images of the template cards and one or more known color samples, process the images, output known sample RGB values and at least one reference color RGB value, store at least one reference color RGB value as a calibration RGB value matrix for color correction, compare the known sample RGB values with the RGB values of corresponding color definitions stored within the database, and perform a least squares fit of the output known sample RGB values to the corresponding color definition RGB values to generate coefficients of a transform function for transforming output RGB values into corresponding color definition RGB values. The processor may also be configured to associate the calibration RGB value matrix and transform function coefficients with a machine-readable code on the template cards. The system may also include an image capturing device configured to capture the images.

A new method for color determination may include obtaining one or more images of template cards and one or more known color samples, outputting known sample RGB values and at least one reference color RGB value, storing the at least one reference color RGB value as a calibration RGB value matrix for color correction, comparing the output known sample RGB values with RGB values of corresponding color definitions stored within a database, and performing a least squares fit of the output known sample RGB values to the corresponding color definition RGB values to generate coefficients of a transform function for transforming output RGB values into corresponding color definition RGB values. The method may also include associating the calibration RGB value matrix and transform function coefficients with a machine-readable code on the template cards. Obtaining the images may involve actuating an image capturing device.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions, or rearrangements.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 1 depicts an exemplary embodiment of a template card and a color measurement device.

DETAILED DESCRIPTION

Figure 2:
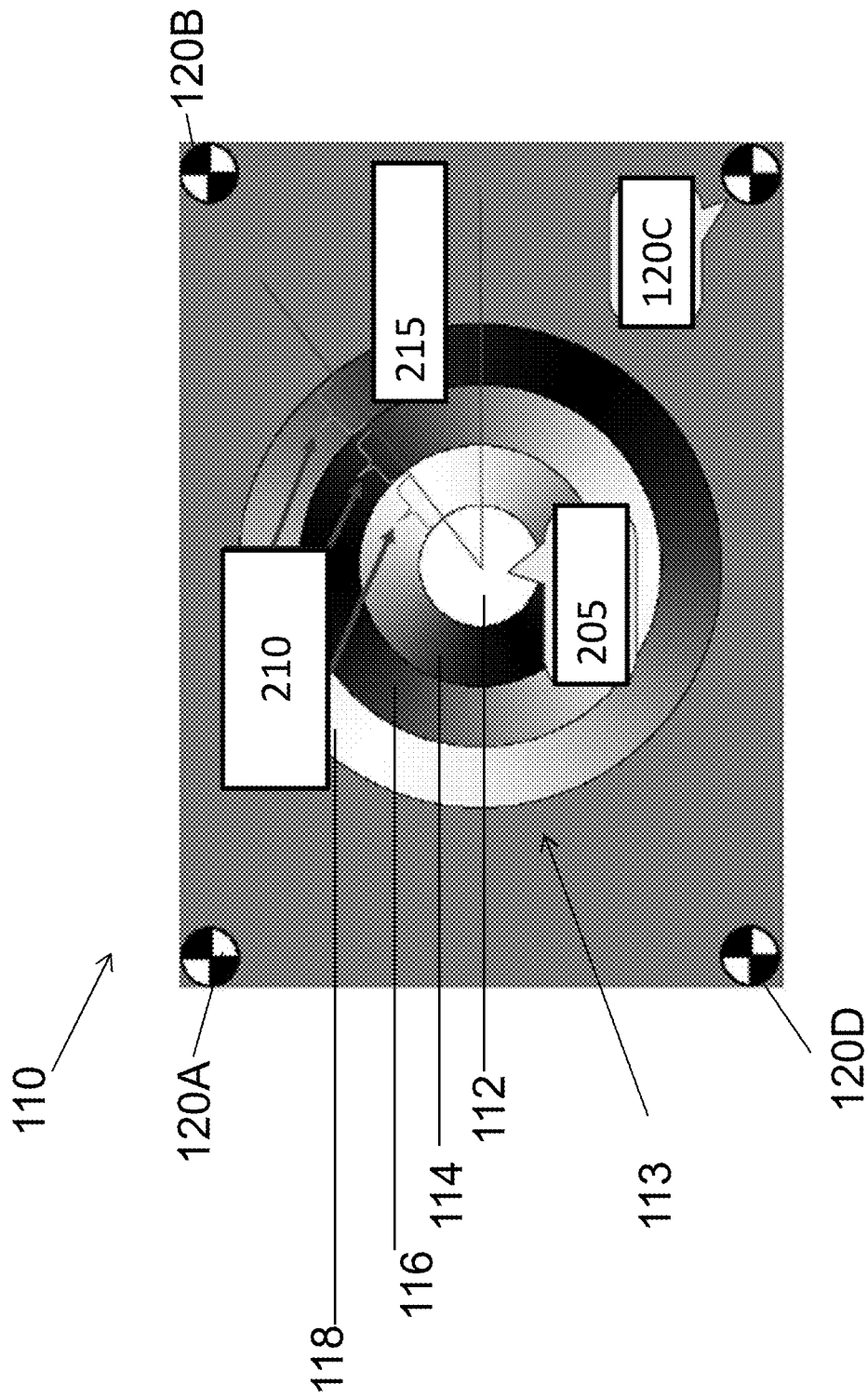
FIG. 2 depicts an exemplary embodiment of a template card.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Furthermore, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any embodiments, examples or illustrations given herein are not to be regarded in any way as restrictions on, limits to, or express definitions of, any term or terms with which they are utilized. Instead, these embodiments, examples or illustrations are to be regarded as being described with respect to one particular embodiment and as illustrative only. Those of ordinary skill in the art will appreciate that any term or terms with which these embodiments, examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer, desktop, laptop, netbook, tablet, smartphone, or the like, communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database locally or over the network.

ROM, RAM, and HD are computer memories for storing computer-executable instructions executable by the CPU or capable of being complied or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc.

Embodiments described herein disclose a color measurement device and method for use with cameras or any imaging device. The color measurement device may be configured to determine many different colors via a commonly owned template card. Embodiments utilize various markings on the template card, such as sinusoidal grayscale rings or lines, sample colors, sample patterns, and alignment features to determine an exact color match of an unknown color, even if there is perspective distortion in the obtained image. In effect, the template card is predetermined and known to the color matching system and serves as a predetermined reference card.

FIG. 1 depicts an exemplary embodiment of a color matching system including template card 110 and a color measurement device 130 for determining an exact color match of an unknown color. As used herein, the term "exact color match" means an identification of the RGB values of a known color that equate to the RGB values of the unknown color, or are within a margin of error acceptable for the specific application.

According to one embodiment of the present invention, template card 110 may include a center cut-out 112, a plurality of concentric rings 113, and corner quadratic wheels 120A-D. As shown in this embodiment, a single template card 110 may include a plurality of different continuous gray scales—in this case concentric rings 114, 116, 118. In this embodiment, to determine an unknown color, it is unnecessary to include samples of different colors, other than gray scales, on template card 110 because the gray scales include red, green, and blue responsive curves. In other embodiments, component colors may be incorporated in addition to one or more gray scales.

Center cut-out 112 may be an orifice disposed at the center of template card 110. Center cut-out 112 may be configured to be disposed over an unknown color sample, such that template card 110 may be superimposed on the unknown color and color measurement device 130 may be configured to obtain an image of the unknown color through center cut-out 112.

The plurality of concentric rings 113 may include an inner ring 114, a middle ring 116, and an outer ring 118. Each of the plurality of concentric rings 113 may have a two hundred and fifty-six level gray scale that is modulated sinusoidally as a function of polar coordinate angle (256 level gray scales corresponds to 8-bit color). One skilled in the art will appreciate that in other embodiments, different gray scales for each of the plurality of concentric rings 113 may be used. For example, one or more of the rings 114, 116, and 118 could comprise a 65,535 level gray scale that corresponds to 16-bit color. In one embodiment, inner ring 114 may be phase shifted by +120° with respect to middle ring 116, and outer ring 118 may be phase shifted by −120° with respect to middle ring 116. Because the plurality of concentric rings 113 are phase shifted, middle ring 116 may have an intensity profile of Im=A*cos(t)+B, inner ring 114 may have an intensity profile of Ii=A*cos(t+120°)+B, and outer ring 118 may have an intensity profile of Io=A*cos(t−120°)+B. In embodiments, A and B may be chosen to maximize the template printer dynamic range of the gray scales, where A may be a white scaling and B may be a black offset, and t may be a polar angle of a radial cross section of the plurality of concentric rings 113.

Corner quadratic wheels 120A-D may each be disposed at a corner of template card 110, and may each be divided into four equal subsections. Because corner quadratic wheels 120A-D are distinct, known image processing techniques, such as cross, corner, or symmetry detectors may be used to identify the centers of each corner quadratic wheel 120A-D. The intersection point of a first diagonal line from the center of corner quadratic wheel 120A to corner quadratic wheel 120C and a second diagonal line from the center of corner quadratic wheel 120B to corner quadratic wheel 120D may be configured to determine the centroid of center cut-out 112. Since lines remain lines, even at different viewing perspectives, this technique is robust against any camera tilt. Any segment emanating from the center of center cut-out 112 may, in this embodiment, be a true radius of the plurality of concentric rings 113.

The circular shape of the wheels 120A-D illustrated in FIG. 1 makes them invariant to image orientation, symmetric with rotations of 0 and 180 degrees, and anti-symmetric with rotations of +/−90 degrees so that the orientation of a single quadratic wheel gives the orientation of the template card. Additionally, in some template card embodiments, additional information is provided on the card, such as the bar code shown in FIG. 6. Wheels 120A-D may also be used to locate such additional information. Finding one of the corner wheels also gives the proximity of other wheels, since the center of two of the other wheels lie along lines extending from the diameters produced by the quadrants. In other embodiments, other appropriate marking schemes may be used to provide such functionality.

Color measurement device 130 may be a device configured to obtain an image of an unknown color sample, determine polar angles (t) of radial cross-sections of the concentric rings 113 where the determined intensity matches the determined red, green, and blue values for the color sample image, and determine a color match of the unknown color based on a true red color value, a true green color value, and a true blue color value of the color sample responsive to functions of the polar angles (t). In embodiments, an unknown camera gain and lighting effects may not affect the true red, green, and blue color values because the camera gain and lighting effects affect template card 110 in the same manner as they affect a sample of the unknown color. Thus, the template card 110 serves as a reference card to eliminate the many variations that can impact the perception or imaging of an unknown color sample.

Inevitably, there may be some difference in camera gain and/or lighting gain between different regions of the template card 110 (e.g. the color sample and the surrounding rings) but the difference may be negligible. To achieve a given RGB measurement error, the residual nonuniformity of camera gain and lighting effects between the unknown color sample and the rings may be less than three times the desired RGB measurement error. In other words, to achieve RGB values with 98% accuracy, nonuniformity may be up to 6%. Nonuniformity of less than three times desired RGB measurement error may be considered equality of camera gain and lighting effects between the unknown color sample and the concentric rings 113.

In embodiments where the background color of the card (e.g. outside the concentric rings, excluding any distinctive markings such as corner quadratic wheels) is uniform and known, one can utilize this fact to compute and subtract out of any smooth nonuniformity, resulting in a residual nonuniformity several times smaller than the actual. This may be done by sampling a number of points in the image of the template background, which are known to be the same color, and determining the variance in the image from the known color based on the location of the point to find and remove smooth nonuniformity. For example, the points may be fitted to a parabolic curve, with everything up to the $2^{nd}$ order removed. Some allowance may be made for potential discoloration of the background due to long or heavy use, soiling, etc., which may for example result in data points that are discarded as too far off the known background color, or in a notification regarding this possible problem, which may prompt the user to decide whether to drop the data point, or to abandon the smooth nonuniformity removal process.

Using the embodiments depicted in the FIGURES, equality of camera gain and lighting effects may be achieved in all but the most extreme lighting conditions (e.g. a sharp and dark shadow directly across one side of the rings).

In embodiments, color measurement device 130 may include a camera 132, an RGB color module 134, an angular module 140, and an exact color module 142.

The measurement device 130 may be configured to execute modules 134, 140, and 142 by software; hardware; firmware; some combination of software, hardware, and/or firmware; and/or other mechanisms for configuring processing capabilities on measurement device 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 134, 140, and 142 are illustrated in FIG. 1 as being implemented within a single measurement device, one or more of modules 134, 140, 142 may be implemented remotely from the other modules. The description of the functionality provided by the different modules 134, 140, and 142 described below is for illustrative purposes, and is not intended to be limiting, as any of modules 134, 140, and 142 may provide more or less functionality than is described. For example, one or more of modules 134, 140, and 142 may be eliminated, and some or all of its functionality may be provided by other ones of modules 134, 140, and 142. As another example, measurement device 130 may be configured to execute one or more additional modules that may perform some or all of the functionality attributed below to one of modules 134, 140, and 142.

Camera 132 may be a device configured to record images, which may be still images or videos. In embodiments, camera 132 may be configured to record an image or a frame of a video of an unknown color through center cut-out 112 of template card 110. In other words, the image captured by camera 132 will include the entirety of template card 110 (or at least the relevant parts of template card 110 to the particular color determination process) and the unknown color in center cut-out 112. In embodiments, camera 132 may be included in a mobile phone, tablet, PDA, DSLR camera, point and shoot camera, webcam, any consumer image device, or any other device configured to obtain an image.

RGB color module 134 may be configured to determine a red color value of the unknown color based on an average red color reading of the unknown color and determined intensity and intensity profile of inner ring 114 (and/or middle ring 116 and outer ring 118). In embodiments, the radial cross section of inner ring 114 may be chosen to determine the red color value of the unknown sample because inner ring 114 may be the most proximate of the plurality of concentric rings 113 to the sample of the unknown color. Therefore, inner ring 114 may be the least sensitive of the plurality of concentric rings 113 to any non-uniformity of color measurement device 130.

First, the radial cross-section of the inner ring 114 where the measured intensity of the inner ring 114 matches the measured average red color reading of the unknown color is determined. Second, the true polar angle (t_red) of this radial cross-section is determined using angular module 140 (as discussed in detail below). Third, the true average red color value of the unknown color is determined as the inner ring intensity at the calculated polar angle (t) using the inner ring intensity profile Ii=A*cos(t_red+120)+B and the known polar angle (t_red) and A and B values. This procedure is then repeated for the green color determination and the blue color determination, with the true polar angles for green and blue, t_green and t_blue, used instead of t_red.

Each gray-scale ring 112, 114, 116 includes all three color modulations, red, green, and blue, making embodiments compact, universal, and inexpensive to print. Although the proximity advantage of the inner ring 114 may be lost, other implementations may utilize the middle ring 116 or the outer ring 118 or even a combination of all three for determining the red, green and/or blue color values of the unknown color sample. A combination of rings 112, 114, 116 might be used, for example, by finding the true average color values using two or all three of the rings 112, 114, 116 independently, and then averaging the determined values or using a weighted average, which may account for lessened accuracy as the determinations move away from the center of the template card 110. For example, the inner ring value may be given a 50% (½) weight, the middle ring value may be given a 33% (⅓) weight, and the outer ring value may be given a 17% (⅙) weight. Using a combination may help to compensate for uneven shadow and/or eliminate noise.

Angular module 140 may be configured to determine the polar angle (t) of the radial cross-section of each of the plurality of concentric rings 113 where the intensity matches the measured average color value of the unknown color. In embodiments, if camera 132 obtains an image of template card 110 superimposed over the unknown color from a tilted or off-center perspective, the observed concentric ring 113 patterns of the obtained image may change. For example, if an image of template card 110 is obtained from a tilted perspective, the plurality of concentric rings 113 may appear to be elliptical instead of circular. However, the radial cross-sections of the plurality of the concentric rings 113 remain the same, since a line remains a line irrespective of the view angle. The polar angles (t) of the radial cross-sections may be determined from the sampled intensities of each concentric ring 113, as discussed below. So, once determined, the polar angles (t) of the plurality of concentric rings 113 may then be utilized to look up the true red, green, and blue color values.

Thus, first a radial section from the center of the template cut-out 112 through the radial concentric rings 113 is found which best matches the sample intensity to the intensity of the radial cross-section of one of the concentric rings 113 through which the radial segment extends. That is done simply by matching the intensity of the sample to the intensity of a cross section of one of the concentric rings 113 and extending a segment from that radial cross-section through the center of the template card 110 and through the circumference of the outer ring 118. Once that is accomplished, one can use the intensities of the concentric rings 113 cross-sections to determine the polar angle (t) using determined intensity values of the cross-sections and the known (and designed) trigonometric relationship between the intensity profiles of the concentric rings 113. Once the best estimated polar angle is known, it can be used to infer the color intensity of the unknown sample. Angular module 140 may be configured to determine the polar angle (t) utilizing the intensity profiles of each of the plurality of concentric rings 113 (completely independent of the camera gain and lighting conditions) and trigonometric manipulations of the intensity profiles of the plurality of the concentric rings 113 as intersected by the radial segment.

In embodiments, the total camera and lighting scaling gain (k) and camera zero (Z) affect template card 110 in the same manner as they affect the unknown color. The intensity profile of middle ring 116 may have a gain intensity profile equal to Pmid=k*[A*cos(t)+B]+Z, the intensity profile of inner ring 114 may have a gain intensity profile equal to Pin=k*[A*cos(t+120)+B]+Z, and the intensity profile of outer ring 118 may have a gain intensity profile equal to Pout=k*[A*cos(t−120)+B]+Z. A and B are gray level encoding constants.

Utilizing trigonometry properties, angular module 140 may determine the polar angle (t) of a given radial cross-section using the equation t=a tan 2[√3(Pout−Pin), 2*Pmid−(Pin+Pout)], where the intensities of the concentric rings at the given radial cross-section can be measured directly and substituted into the equation to solve for t. The true/corrected RGB value is determined, as noted above, by substituting the determined t and known A and B values into the intensity profile for the appropriate concentric ring.

Note that the variables associated with gain and lighting conditions and zero level drop out of the equation. Zero level is subtracted out, gain level is divided out, $2^{nd}$ order non-linear gain is subtracted out, resulting in built-in auto white balancing. By comparing the corrected RGB against Pin, Pmid, and Pout, gamma compression can be undone. Even though the measured intensities may not match the actual intensities, as all the concentric rings 113 will be subject to the same error sources, the trigonometric relationship between the measured intensities of the concentric rings will hold, allowing the true polar angle to be determined. The process is therefore insensitive to nonlinearity in camera gain and zero level of the image capturing sensor and allows for precise camera gamma correction. Results are not dependent on camera type or brand, and are consistent across a range of lighting.

Exact color module 142 may be configured to determine the true color of the unknown sample and report it either as a RGB value or as a match to particular known colors. For example, exact color module 142 may determine the true color of the unknown sample based on the average red, green, and blue (RGB) color values of the unknown sample as determined by RGB color module 134 and report those values. Exact color module 142 may then compare the RGB value of the unknown sample to a color database which lists known colors (such as manufacturers' paints) by RGB value and color name and report the closest match, or set of closest matches.

Accordingly, color measurement device 130 may be configured to determine the angular coordinates of radial cross-sections of each of the plurality of concentric rings 113 on template card 110 even if an obtained image of template card 110 includes perspective distortion. Furthermore, color measurement device 130 may be configured to determine the color of an unknown color sample based on the behaviors of three different intensity profiles of the plurality of concentric rings.

FIG. 2 is another view of exemplary template card 110 with center cut-out 112, a plurality of concentric rings 113, and corner quadratic wheels 120A-D.

Center cut-out 112 may be configured to be disposed over an unknown color, such that the measured color values of the unknown color 205 may be compared with the radial segment cross-sections 210 of each of the plurality of concentric rings 113, including inner ring 114, middle ring 116, and an outer ring 118. Each of the plurality of concentric rings 113 may be associated with any or all of the different red, green, and blue color values of the unknown color. Therefore, based on the unknown color values, there will be different polar angles (t) 215, at which any or combination of radial segment cross-sections at the color values correspondingly best match the unknown color values.

Corner quadratic wheels 120A-D may be each disposed at a corner of template card 110, and may each be divided into four equal subsections. The intersection of a first diagonal line from the center of corner quadratic wheel 120A to corner quadratic wheel 120C and a second diagonal line from the center of corner quadratic wheel 120B to corner quadratic wheel 120D may determine the center of center cut-out 112.

Responsive to determining the center of center cut-out 112, the polar angles (t) 215 of radial segment cross-sections 210 of concentric rings 113 on template card 110 corresponding to the color values of the unknown color 205 may be determined with measured intensities. Based on the polar angles (t) 215 and the known intensity profiles of each of the plurality of concentric rings 113, the true color values of the unknown color may then be determined and color matching may be performed as described above.

Figure 6:
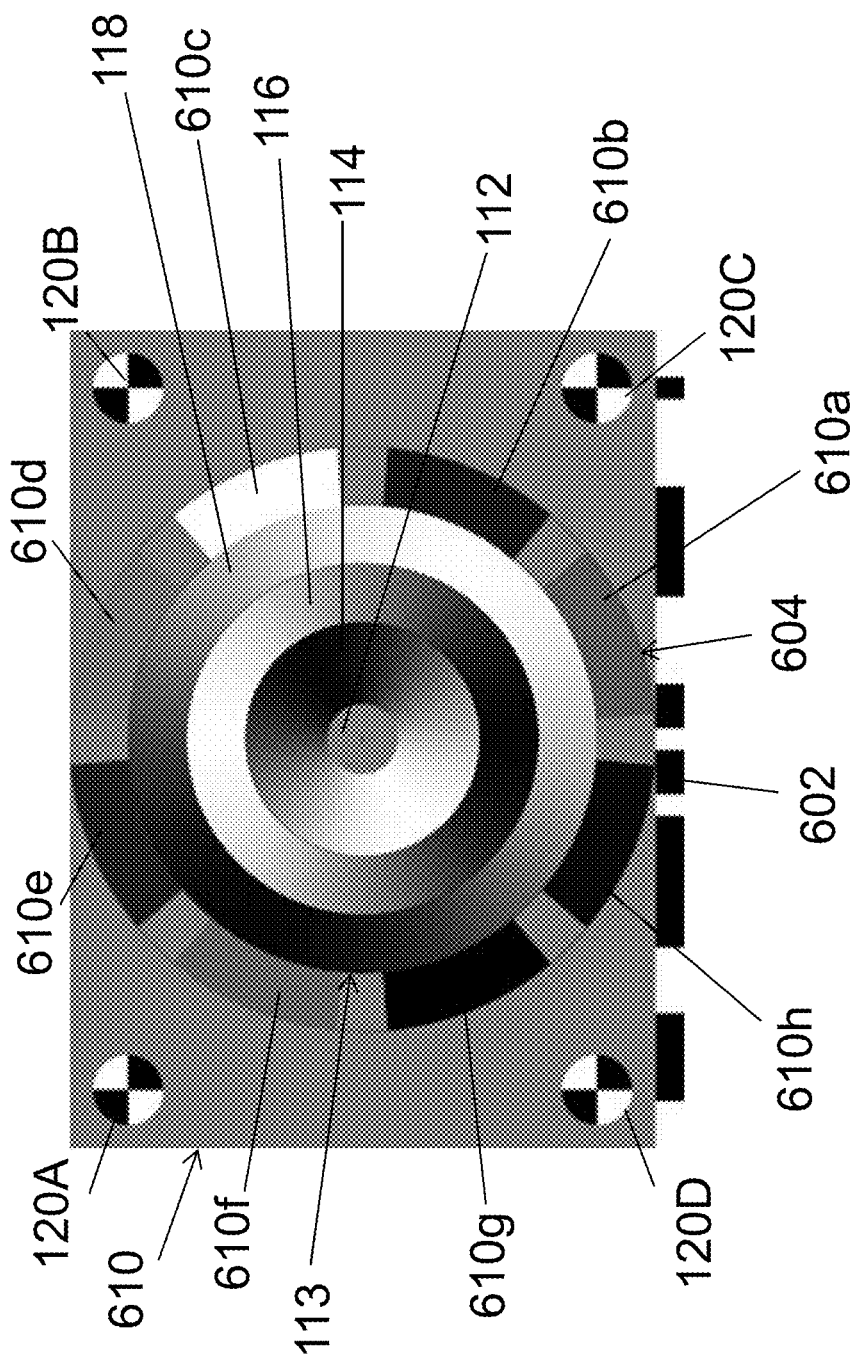
FIG. 6 depicts an exemplary embodiment of a template card.

FIG. 6 depicts yet another exemplary embodiment of template card 610 with built-in color correction. Template card 610 is similar to template card 110 shown in FIGS. 1 and 2, and includes center cut-out 112, concentric rings 114, 116, and 118, and quadratic wheels 120A-D. In addition to these features, this embodiment portrays two additional features, including barcode 602 and color component ring 604, which may be implemented singly or together. In this embodiment, color component ring 604 includes eight distinct colors (including, e.g., green 610a, red 610b, white 610c, yellow 610d, magenta 610e, cyan 610f, black 610g, and blue 610h) abutting outer concentric ring 118 and separated radially from one another, but may include more or less colors in any appropriate configuration. Color component ring 604 is arranged outside concentric rings 114, 116, and 118 and is intended to enhance the accuracy of color measurement and identification.

For example, the measured RGB values for the color component ring 604 in the image with the unknown color sample can be compared to measured RGB values for the color component ring 604 during a calibration process with controlled lighting and camera/sensor conditions to calculate a color correction matrix. This color correction matrix can be used to adjust the measured RGB values of the unknown color sample to compensate, to the first order, for the environmental conditions (e.g. lighting/light spectra, imaging device/sensor spectral response) under which the image was taken, making a comparison to RGB values of potential color matches measured under different, controlled conditions more accurate.

An RGB reading for an image portion can be described as the sum of functions of the sensor used to take the reading, the lighting in which the reading was taken, and the reflectance of the object(s) imaged, as follows:

$$\propto \int_0^\infty \text{Sensor }(\lambda)\cdot\text{Lighting }(\lambda)\cdot\text{Reflectance }(\lambda)\cdot d\lambda$$

$$\text{Reflectance}(\lambda)=r\text{Red}(\lambda)+g G(\lambda)+b B(\lambda)$$

For neutral color, the Reflectance is nearly constant, so color correction is not needed.

But in general, substituting the reflectance equation into the original integral, we have: Each RGB reading $\propto$ $$r\int_0^\infty \text{Sensor}(\lambda)\cdot\text{Lighting}(\lambda)\cdot\text{Red}(\lambda)\cdot d\lambda$$

$$+g\int_0^\infty \text{Sensor}(\lambda)\cdot\text{Lighting}(\lambda)\cdot\text{Green}(\lambda)\cdot d\lambda$$

$$+b\int_0^\infty \text{Sensor}(\lambda)\cdot\text{Lighting}(\lambda)\cdot\text{Blue}(\lambda)\cdot d\lambda$$

There are three integrals each for the red value, green value and blue value. Component colors 610a-h (outer rim) are added for "measuring" the nine integrals. These nine integrals are the nine elements of color calibration matrix Mcc below. The closer the spectral match of the component colors on the IC-Wheel to those of the sample, the more accurate the color correction will be.

Barcode 602 may be used to lookup information relating to the template card, such as calibration information pertaining thereto, paint manufacturer(s), users, retailers, etc. Including calibration information on the cards allows manufacturing requirements to be relaxed, such as by lowering tolerance requirements, which in turn lowers costs.

For example, the template cards may be calibrated after they are manufactured. Template cards from a batch manufactured together may be photographed straight on with diffuse photographer lighting over a set of (e.g., sixteen) color samples. RGB measurements may then be made using each image in conjunction with the template cards' gray scales per the description herein. Then, these measured RGB values are correlated to colors within a manufacturer database using, for example, a least square correlation algorithm, and a transform matrix is derived and saved. Next, a new RGB database is created based on the saved matrix, and the new RGB database and transform matrix are locked to the barcode printed on the batch of template cards.

In some embodiments, the template cards may be calibrated as described above with color samples of various finishes, resulting in a separate RGB database and transform matrix for each type of finish used in the calibration. Finish of a color sample may be user-selected or automatically detected when color matching is desired so that the appropriate database and matrix are used.

For calibration, manufacturer swatch samples (or other samples) corresponding to colors stored in the database are measured for RGB values with template cards as described herein, and at the same time RGB values for the component colors may be measured using the same method and images. The RGB values measured by this method for the component colors form a calibration matrix M_calib which can be used later during measurement to derive a color correction matrix that adjusts for differences between the calibration setting and real-world measurement (e.g., lighting, sensor, etc.). The measured swatch RGB values are then correlated to the manufacturer database RGB values corresponding to the swatches using, for example, a least squares algorithm. A customized database is then formed based on the fitted trend. So, when an unknown sample is taken, the color correction matrix is applied first and then the least squares fitted trend. In embodiments, color correction and least squares fitting trend may be performed by the exact color module, and/or by one or more modules dedicated to color correction and/or least squares fitting. Finally, the adjusted and corrected measured sample is matched to the customized database, ensuring the same consistency as if the sample was measured using the calibration setup.

In an example of this process, a batch of template cards is used to measure 1320 paint swatches for a given paint manufacturer. The RGB value of each of the swatches is measured using the template cards as described herein, and plotted against the corresponding RGB values supplied by the paint manufacturer. The measured RGB values are correlated to the corresponding manufacturer RGB values using a least squares algorithm and known techniques to obtain third order polynomial coefficients to transform the measured RGB values into adjusted RGB values for matching against the manufacturer-provided RGB values. In this case, the coefficients were calculated to be as follows: red coefficients [9.90217e-06, −0.0034507, 0.975559, 57.2588], green coefficients [8.97079e-06, −0.0032746, 0.962333, 55.9677], and blue coefficients [4.89502e-06, −0.00184182, 0.830719, 57.7655]. These coefficients define the polynomial to map the measured RGB values to the database (manufacturer) RGB values.

In this example, each of the swatches is measured four times. The average of each swatch measurement set is taken, and the above polynomial is applied to form a custom database, which now reflects the method of calibration. So, for example, the color "Hint of Vanilla", which the manufacturer characterizes as [238, 232, 216], is registered as [242, 225, 208] in the custom database, which compares better with future measurements outside of the calibration environment.

Using one or more of the same images used to measure RGB values of the paint swatches, RGB values of the component colors of the template cards are measured and stored in a matrix M_calib as discussed above. In this example, the matrix is as follows, where each row corresponds to the measured RGB value for one of the eight component colors:

$$\begin{bmatrix} 117.179 & 13.1688 & 74.8555 \\ 42.6003 & 132.935 & 140.366 \\ 7.38968 & 12.4911 & 15.0142 \\ 11.6666 & 12.7032 & 72.9212 \\ 33.0536 & 127.26 & 49.8772 \\ 127.302 & 6.26752 & 5.41621 \\ 241.613 & 248.144 & 251.829 \\ 129.118 & 128.465 & 33.8146 \end{bmatrix}$$

In other embodiments, there may be more or less component colors. Color correction starts after an RGB value of a color sample has been measured for a user as discussed herein using the gray scales. For example, a color sample of "Hint of Vanilla" may be measured by a user to have raw RGB values (using the grey rings) of [249.18, 243.1, 230.02]. The eight component colors are measured according to this same process, using the same image, and in this example their RGB values are measured to be: [107.55, 15.694, 82.468], [36.543, 136.9, 146.97], [7.2466, 6.571, 4.8558], [19.495, 17.289, 82.897], [27.156, 128.28, 64.878], [124.34, 13.159, 10.08], [243.7, 242.63, 245.64], [126.56, 131.97, 43.998]. Together, they form an 8×3 matrix M_meas as follows:

$$\begin{bmatrix} 107.55 & 15.694 & 82.468 \\ 36.543 & 136.9 & 146.97 \\ 7.2466 & 6.571 & 4.8558 \\ 19.495 & 17.289 & 82.897 \\ 27.156 & 128.28 & 64.878 \\ 124.34 & 13.159 & 10.08 \\ 243.7 & 242.63 & 245.64 \\ 123.56 & 131.97 & 43.997 \end{bmatrix}$$

The color correction matrix M_cc is calculated as follows: M_cc=Mmeas$^{-1}$*M_calib, in this example:

$$\begin{bmatrix} 107.55 & 15.694 & 82.468 \\ 36.543 & 136.9 & 146.97 \\ 7.2466 & 6.571 & 4.8558 \\ 19.495 & 17.289 & 82.897 \\ 27.156 & 128.28 & 64.878 \\ 124.34 & 13.159 & 10.08 \\ 243.7 & 242.63 & 245.64 \\ 123.56 & 131.97 & 43.997 \end{bmatrix}^{-1} \begin{bmatrix} 117.179 & 13.1688 & 74.8555 \\ 42.6003 & 132.935 & 140.366 \\ 7.38968 & 12.4911 & 15.0142 \\ 11.6666 & 12.7032 & 72.9212 \\ 33.0536 & 127.26 & 49.8772 \\ 127.302 & 6.26752 & 5.41621 \\ 241.613 & 248.144 & 251.829 \\ 129.118 & 128.465 & 33.8146 \end{bmatrix}$$

$$\text{Leading to } M_{cc} = \begin{bmatrix} 1.0123 & -.013219 & .0083576 \\ .018595 & 1.0103 & -.040077 \\ -.017586 & .00039928 & 1.0083 \end{bmatrix}$$

Multiplying the measured RGB values for the color sample by the color correction matrix gives the following corrected measured RGB values:

$$[249.18 \quad 243.1 \quad 230.02]*$$

$$\begin{bmatrix} 1.0123 & -.013219 & .0083576 \\ .018595 & 1.0103 & -.040077 \\ -.017586 & .00039928 & 1.0083 \end{bmatrix} = [252.73 \quad 242.41 \quad 224.28]$$

The corrected measured RGB value corrects for differences in lighting and sensor between the calibration process and actual real-world conditions under which the image was captured. The corrected measured RGB value can then be adjusted using calibration data to account for differences between RGB values measured during calibration and what a paint (coating or other color substance) manufacturer indicates the color's RGB values to be. A mapping, for example a polynomial mapping, determined during the calibration process as described above, can be applied to the corrected measured RGB values to arrive at the final RGB values used to match to a paint (or other) color, for example in a database of such colors.

In this example, a third order polynomial mapping was generated during the calibration process, as noted above: red coefficients [9.90217e-06, −0.0034507, 0.975559, 57.2588], green coefficients [8.97079e-06, −0.0032746, 0.962333, 55.9677], and blue coefficients [4.89502e-06, −0.00184182, 0.830719, 57.7655]. Thus, the red value (252.73) is plugged into the equation $9.90217e-6(R^3)-0.0034507(R^2)+0.975559R+57.2588$ to arrive at the final matching red value of 243.25. The green value (242.41) is plugged into the equation $8.97079e-6(G^3)-0.0032746(G^2)+0.962333G+55.9677$ to arrive at the final matching green value of 224.61. The blue value (224.28) is plugged into the equation $4.89502e-6(B^3)-0.00184182(B^2)+0.830719B+57.7655$ to arrive at the final matching green value of 206.65. Thus, the final RGB value calculated for matching purposes in this example is [243.25, 224.61, 206.65]. The RGB value for this Hint of Vanilla color provided by the paint manufacturer and entered into the database is [242,225,208], so the final RGV values calculated are highly accurate in this example.

Figure 7:
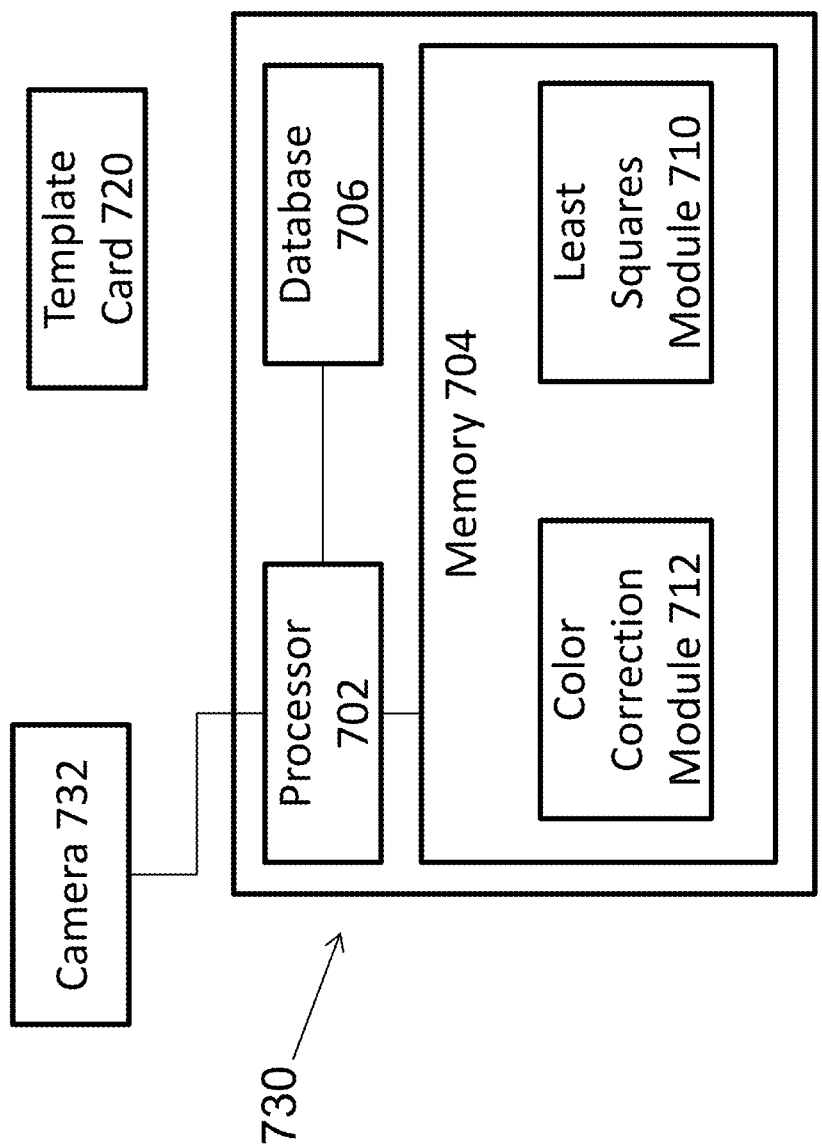
FIG. 7 depicts an exemplary embodiment of a color measurement device.

FIG. 7 depicts an embodiment of a color measurement device 730 usable with template card 720 to determine an unknown color according to one or more of the embodiments and methods disclosed herein. The device 730 includes processor 702 and database 706. Device 730 is similar to Device 130 of FIG. 1, with processor 702 and database 706 being capable of providing the necessary color matching functionality, such as the functionality of RGB color module 134, angular module 140, and exact color module 142 in device 130. For example, database 706 stores color definitions, each having a unique RGB value and processor 702 is configured to receive one or more images of template cards 720 and unknown color samples to provide identification of the unknown color samples according to the methods disclosed herein, or one or more images of template cards 720 and known color samples to provide calibration functionality according to the methods disclosed herein.

The device 730 may operate a camera 732 or other image capturing device to obtain the images, or may obtain an image taken in any known manner. Template cards 720 may have at least one reference scale and at least one reference color, and may be any of the template cards disclosed herein.

In addition to the functionality discussed above, device 730 may process collected images, output known sample RGB values and at least one reference color RGB value, store the at least one reference color RGB value as a calibration RGB value matrix for color correction, compare the output known sample RGB values with the RGB values of corresponding color definitions stored within the database, and perform a least squares fit of the output known sample RGB values to the corresponding color definition RGB values to generate coefficients of a transform function for transforming output RGB values into corresponding color definition RGB values. Processor 702 may be configured to carry out these operations by calling color correction module 712 and least squares module 710 stored in memory 704. In other embodiments, different and/or additional modules may be used.

Figure 8:
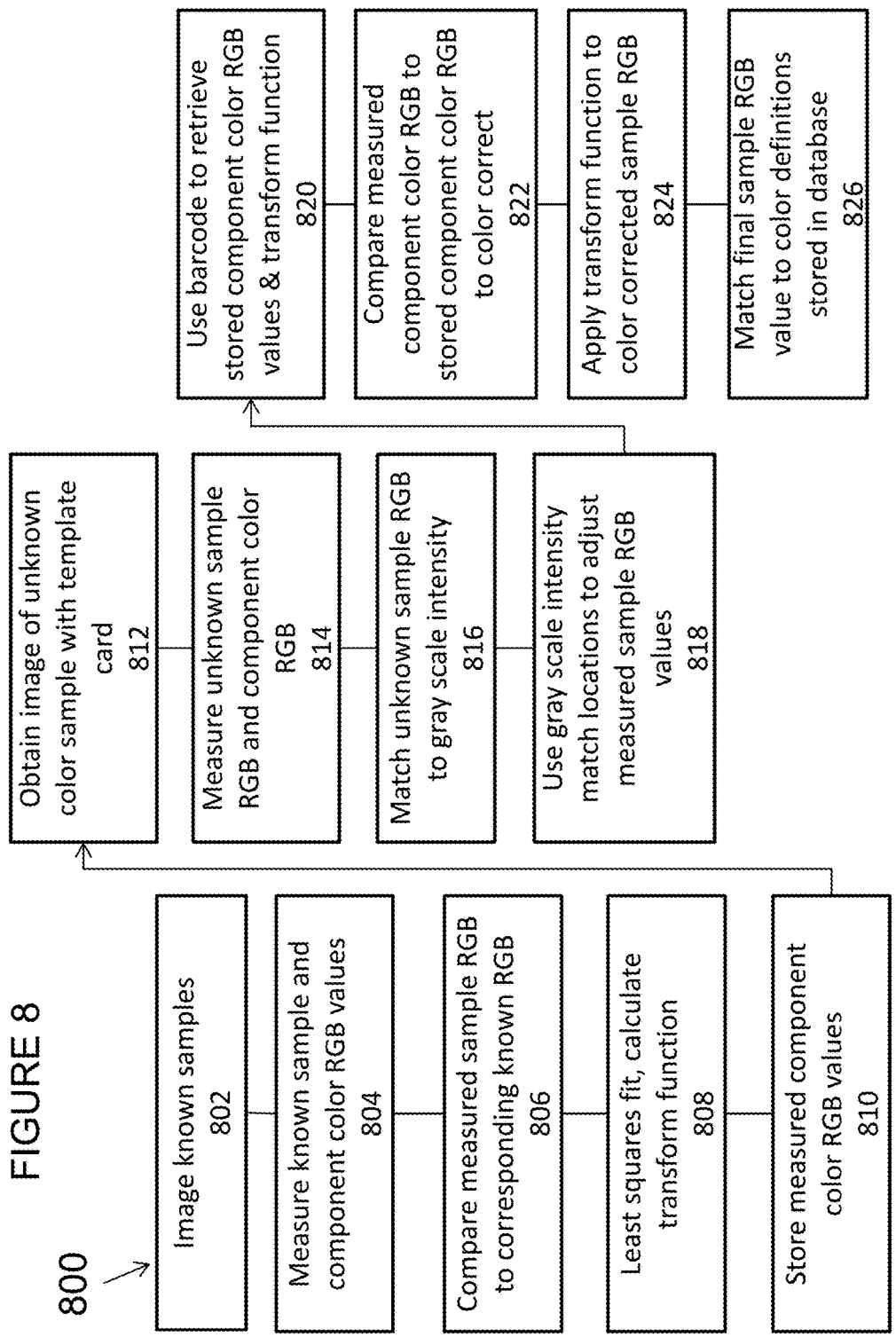
FIG. 8 shows an exemplary embodiment of a color measurement method.

FIG. 8 shows an embodiment of a color measurement method 800 incorporating color correction. First, known color samples are imaged 802 with template cards from a single manufacturing batch. RGB values of the known samples and component colors of one or more of the template cards are measured. The measured RGB values of the known samples are compared 806 to corresponding known RGB values for the known samples and a least squares fit is performed to generate a transform function 808 to translate measured sample RGB values into corresponding known RGB values. The measured component color RGB values are stored 810 for later use in color correction.

At a later time when a user wishes to identify an unknown color, the user obtains an image 812 of an unknown color sample together with a template card, for example, by actuating a camera or other image capture device. RGB values of the unknown sample and the component colors of the template card are measured 814. The measured RGB values of the unknown sample are matched to measured intensities of gray scales on the template card 816. Locations of the matching gray scale intensities are used with functions relating gray scale location to known gray scale intensity to improve the measured unknown sample RGB values 818.

A barcode on the template card is used to retrieve the stored component color RGB values and transform function 820. The measured component color RGB values are compared 822 to the stored component color RGB values to correct the improved sample RGB value for differences in lighting, camera, etc. The transform function is applied to the corrected sample RGB value to obtain a final unknown sample RGB value for matching to the known sample RGB values 824, and the closest match or matches to the final unknown sample RGB value are retrieved from color definitions stored in a database 826.

Figure 3:
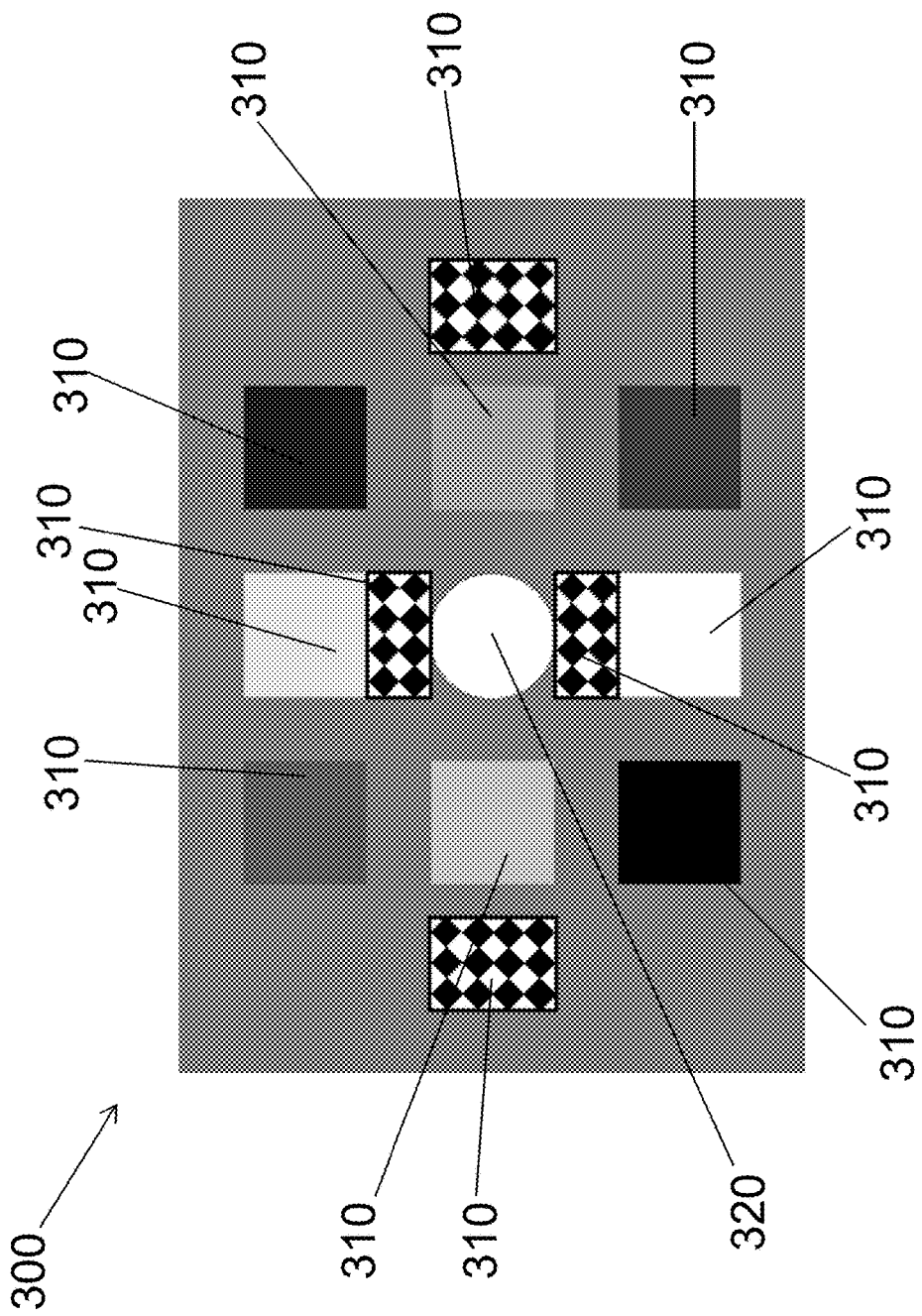
FIG. 3 depicts an exemplary embodiment of a template card.

FIG. 3 depicts another example embodiment of template card 300. Template card 300 may include a plurality of different gray scale samples 310 and center cut-out 320. Measured red, green, and blue color values of an unknown color visible through center cut-out 320 may be compared with samples 310 in an obtained image as in the previous exemplary embodiments to find matches, with linear interpolation used to resolve color values between the intensities of the samples 310. By incorporating a plurality of samples, a color measurement device such as the color measurement devices 130 and 730 can determine an approximate true color of the unknown color while mitigating nonlinearity of an obtained image.

Although templates having two types of gray scales are shown in the figures, any number of gray scales in any locations and shapes on the template card may be utilized in various embodiments, as long as the intensity of each scale on a template is known as a function of its geometric location on the template card. Where there are markings such as 120A-D shown in FIG. 2, the centers of these markings and the center of the cut-out are readily determined from an image of the template card using known image processing techniques, and other locations on the card can be determined with reference to these reference points. In addition or instead of the markings, the corners and sides of the template cards are also usable reference points that often can be readily determined from an image using known image processing techniques.

As with the embodiments shown in FIGS. 1, 2, and 4-6, measured red, green, and blue values of the color sample in the template card cut-out in a captured image are compared to the measured intensity of the rest of the template card to find the closest match. Using the location of the match on the template card and the known intensity function, the true intensity of the matching gray scale is determined for each of the red, green, and blue values of the sample to arrive at an output color sample RGB value, which may be compared against a database of color definitions to match the output color sample RGB value to a paint color or similar. Where there is a limited number of gray scales, there may be no close match between measured red, green, or blue value of the color sample and measured intensity of the gray scales. When that is the case, the two closest matches may be found and distance between these matches may be calculated. In an example, green intensity of the color sample may be measured to be 200 and the closest gray scale intensities may be measured to be 198 and 204, making the color sample measurement ⅓ of the way between the lower and higher matching intensities. When the known intensities of the two matching gray scales are looked up based on the location of the gray scales on the template card, they are found to be 178 and 190. The green value for the color sample may be estimated to be 182, ⅓ of the way between the lower and higher known intensities of the matching gray scales.

Figure 4:
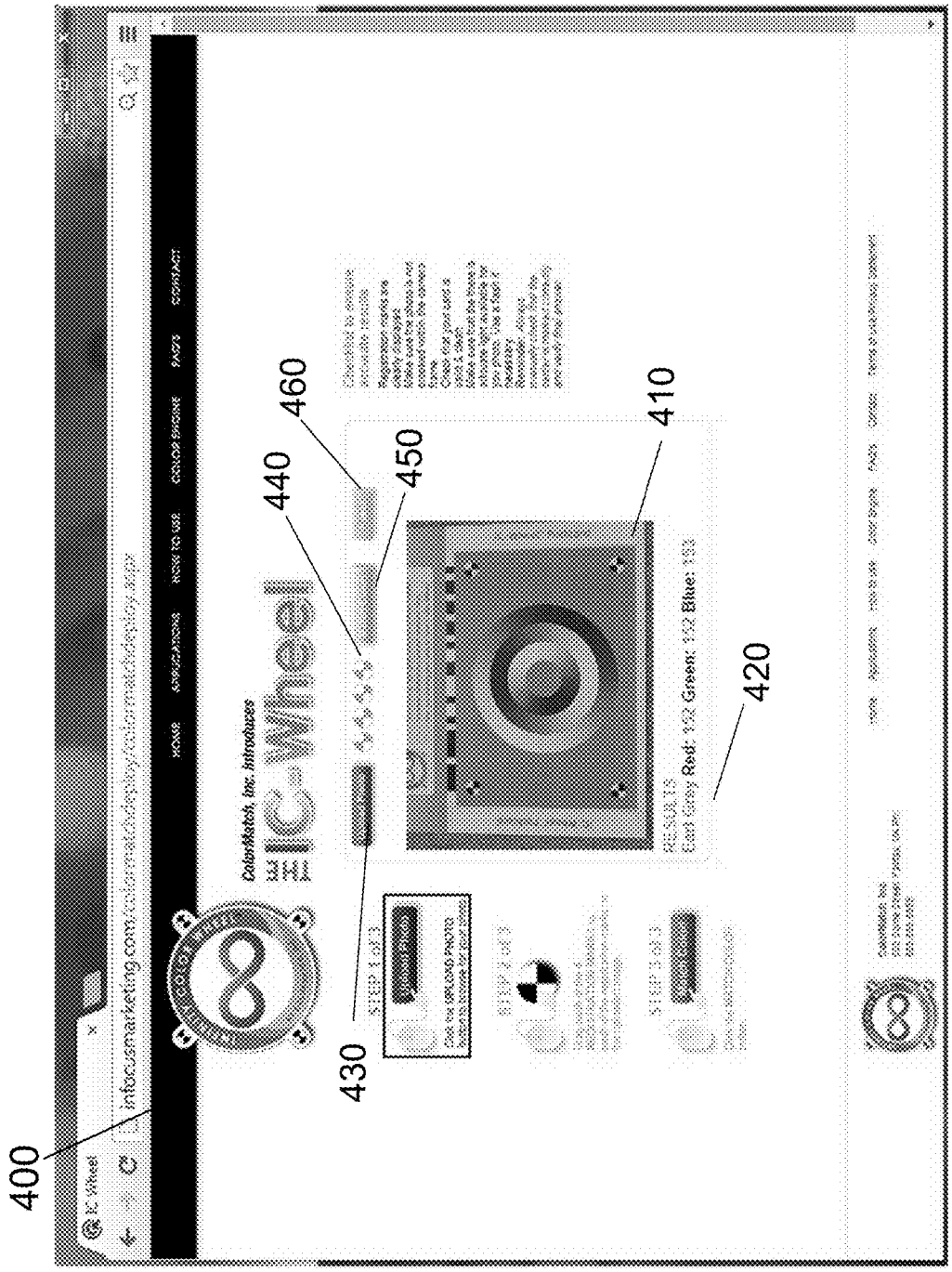
FIG. 4 depicts a screenshot of an exemplary embodiment of a color matching web application.

FIG. 4 depicts a screenshot 400 of a color matching web application. In embodiments, a photograph 410 including a template card and unknown color sample may be uploaded, and the web application may be configured to determine a color 420 for the color sample utilizing embodiments as discussed above. The web application may be configured to utilize the configuration of the template card and the specifications of the camera used to take the photograph with the unknown sample color. In the embodiment shown, a user can select an Upload Photo button 430 to upload the photo 410 from the user's computer or device to a web server, where it is displayed to the user as shown. After the upload, corner quadratic wheels 440 become active, and the user drags each of the corner quadratic wheels 440 to the location of a corner quadratic wheel in the uploaded image 410. In other embodiments, identification of the corner quadratic wheels (or other distinctive markings) in the uploaded image may be performed wholly automatically, but this manual input may improve accuracy and/or simplify image processing. Selection of the Match Color button 450 triggers results 420 to be displayed, while Reset button 460 starts the process over.

The application, whether a web application as depicted in FIG. 4, a mobile app, or similar, may also include instructions for the user for ideal image capture conditions. For example, the camera should be pointing straight at the template card, rather than at an angle, the entire template card should be clear of shadows, diffused lighting is preferred, and spiky spectrum (low-solar reflective index) light sources such as street lights should be avoided. The application can automatically enforce one or more of these requirements, for example it may detect whether the image capturing device is pointed straight at the card, and reject or prevent images taken from other orientations. The color matching algorithm compensates for gradual/diffuse shadow, but sharp shadows may lead to errors. To test for diffused lighting, a user may hold their finger 1" in front of the card and observe no sharp shadow inside the cut-out.

When the application is integrated into a smartphone or other image capturing device, the image may be captured through the app, and the app may have certain functionality to improve the quality of the image captured for the purpose of the color matching. For example, the camera may be automatically zoomed to fit the template card, orientation may be locked in landscape, validation checks may occur as the image is being scanned (e.g. for angle, presence of entire template card, locating and reading bar code, locating corner quadrant wheels and checking for tilt, etc.). The captured image may be automatically uploaded to a server for processing. The application may capture user data such as image capturing device type and information (operating system, service provider, brand), location, time of day, etc., and this data may be used to identify factors that may affect accuracy, and to compensate for them in the future.

Figure 5:
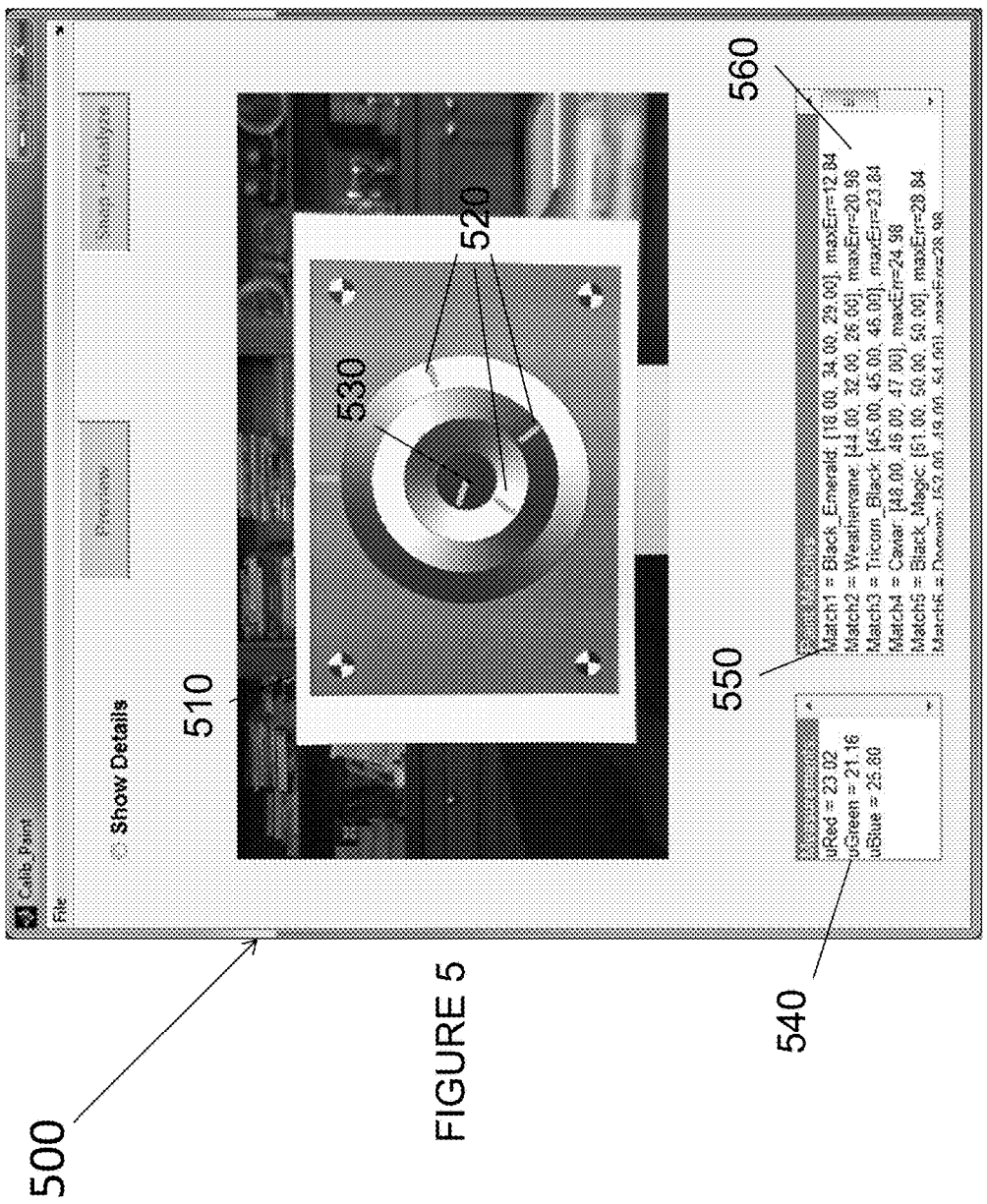
FIG. 5 depicts a screenshot of an exemplary embodiment of a color matching software.

FIG. 5 depicts a screenshot 500 of a color matching software. In screenshot 500, an uploaded photograph 510 is depicted. On the photograph, the radial cross-sections 520 of the three rings that match (one of) the RGB color values of the color sample are shown, as well as the center of the color sample 530. Below the photograph, the calculated RGB measurements 540 are depicted with potential color matches 550 and their maximum error from the measured RGB values 560. These color matches may be selected from a database of colors, for example available paint colors from a paint manufacturer.

In various embodiments, the results may be presented in various ways. Instead of maximum error, closeness of the match may be presented as percent match, for example calculated by 1−(norm(RGB_meas−RGB_ref)/256), where the norm( )function returns the Euclidian norm of the three-value RGB difference vector. For example, if the calculated RGB values are (176, 234, 117) and the closest match is (179, 232, 113) then RGB_meas−RGB_ref is (−3,2,4). The Euclidian norm is then calculated as the square root of the sum of the squares of the vector, here the square root of 9+4+16=29. The percent match would then be calculated as one minus the result of that calculation, 5.39, divided by 256, giving a final percent match of 98%. The number of matches presented may vary, though they generally will be selected from the closest matches identified in a color database. In some embodiments, all matches of 97%-100%, for example, may be presented, with at least one match always being presented. The database of colors may have paint colors from multiple paint manufacturers. The presented matches may include the closest match for some or all of the paint manufacturers reflected in the database of colors, as users may prefer one manufacturer over another for various reasons. The image processing and color matching may be performed almost entirely on a remote server and typical processing time including upload is less than one second.

Figure 9:
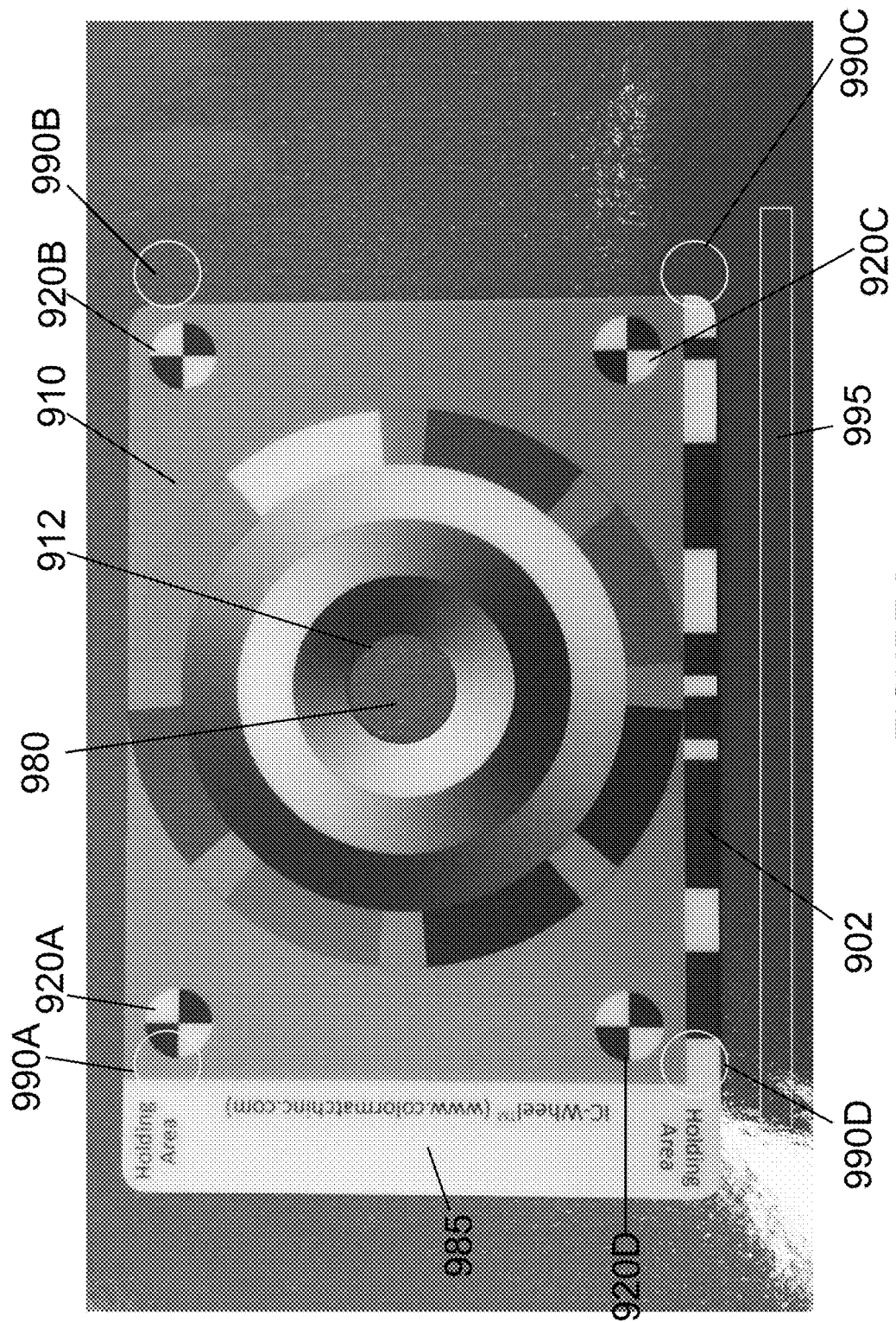
FIG. 9 shows a screenshot of an exemplary embodiment of a mobile application.
Figure 10:
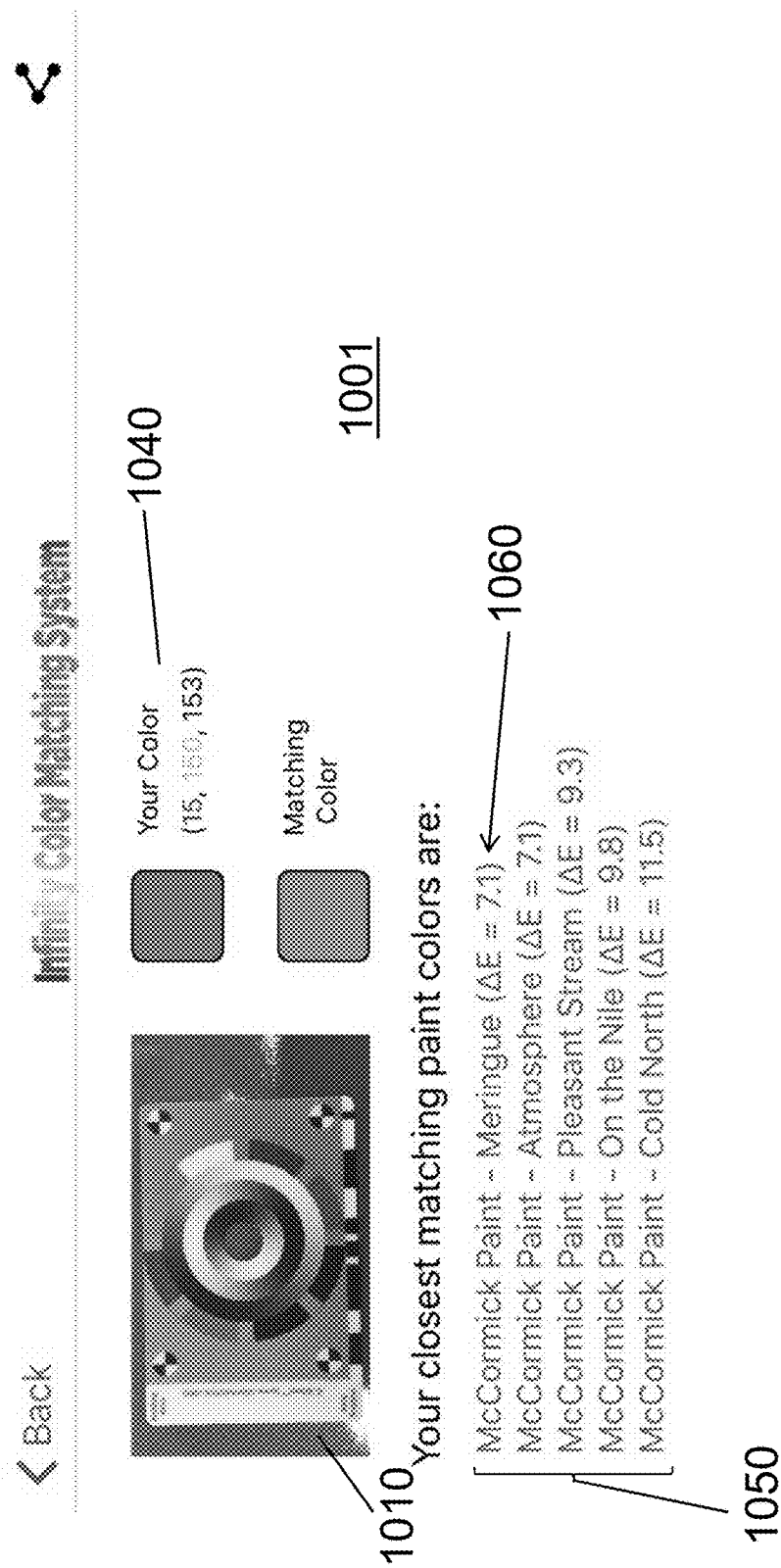
FIG. 10 shows a screenshot of an exemplary embodiment of a mobile application.

In another exemplary embodiment, the color matching software may be implemented, in whole or in part, on a mobile application installed on a mobile device, such as on a mobile phone, tablet, PDA, or other portable device, as shown in FIGS. 9 and 10. In such an embodiment, FIG. 9 illustrates an embodiment where a user has placed a template card 910 on an unknown color 980 viewable through center cut-out 912. Alternatively, template card 910 may be held in place using holding area 985 when required. The user may then align corner aiming circles 990A-D with quadratic wheels 920A-D, respectively, and bar code aiming box 995 with barcode 902 (if a barcode is provided). The aiming process may be performed by the user manually adjusting the position of the phone, by automatic processes, or a combination of both. Once the features are aligned, an image is taken by the camera on the mobile device, either automatically when the mobile software determines that the features are aligned, or manually when the user determines that the same.

Once an image is obtained, it may be analyzed in the manner described herein to determine a color match. The analyzing process may be undertaken by the mobile software on the mobile device, by remote software and/or databases in communication with the mobile device, or by some combination of the two.

After the image is analyzed, as shown in FIG. 10, the mobile application presents the user with a report screen 1001. Report screen 1001 provides the analyzed image 1010, the calculated RGB measurements 1040 of the unknown color 980, and a list of potential color matches 1050. The potential color matches include maximum error information 1060 from the measured RGB values 1040. As discussed herein, potential color matches 1050 may be selected from a database of colors, for example available paint colors from a paint manufacturer, stored on the mobile application or remotely. Any appropriate functionality of the software embodiment illustrated in FIGS. 5 and 6 may also be utilized in this embodiment, and vice versa.

The exemplary embodiments above are explained in the context of paint color identification, but it is not in any way limited thereto. The disclosed technology can find application in any endeavor where color identification is useful, such as cosmetics, medicine, AI, object sorting, interior decorating, restorations, etc.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that, in some instances, some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment, and a person of ordinary skill in the art will recognize that additional embodiments are readily understandable and are a part of this invention.

It is also within the spirit and scope of the invention to implement in software programming or coding the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, where programmable logic devices, field programmable gate arrays, and optical, chemical, biological, quantum, or nanoengineered systems, components, and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What I claim is:
1. A system for determining a color match, comprising:
 a database storing color definitions, each having a unique RGB value;
 a template card comprising at least one reference scale;
 a memory for storing pre-determined calibration RGB values corresponding to the at least one reference scale; and a processor configured to:
  receive a first image of the template card and color sample,
  process the first image and output a sample RGB value corresponding to the color sample and at least one reference scale RGB value,
  apply color correction to the sample RGB value based on a difference between the at least one reference scale RGB value and a corresponding calibration RGB value of the at least one reference scale to produce a color corrected sample RGB value, and
  compare the color corrected sample RGB value with the RGB values of the color definitions stored within the database to determine a color match.

2. The system of claim 1, wherein the processor is further configured to apply a predetermined least squares fitting function to the color corrected RGB value prior to comparing the color corrected sample RGB value with the RGB values of the color definitions stored within the database.

3. The system of claim 1, further comprising a camera configured to capture the first image.

4. The system of claim 1, wherein the template card comprises a substrate and a cut-out, wherein the color sample portion of the image is in the cut-out.

5. The system of claim 4, wherein the at least one reference scale comprises a modulated gray scale arranged on the substrate.

6. The system of claim 4, wherein the at least one reference scale comprises a plurality of gray scales arranged on the substrate.

7. The system of claim 4, wherein the at least one reference scale comprises a plurality of gray scales arranged on the substrate and modulated as a function of an angle of a polar coordinate.

8. The system of claim 4, wherein the at least one reference scale comprises three gray scales arranged on the substrate and modulated as a function of an angle of a polar coordinate, each of the gray scales being offset by 120 degrees with respect to each of the other two gray scales.

9. The system of claim 4, wherein the at least one reference scale comprises a plurality of concentric rings arranged on the substrate around the cut-out, each of the concentric rings having offset gray scales modulated as a function of an angle of a polar coordinate, wherein there is a trigonometric relationship between the gray scales of the plurality of concentric rings.

10. The system of claim 9, wherein the at least one reference scale comprises one or more reference colors arranged around the plurality of concentric rings.

11. The system of claim 10, wherein the one or more reference colors comprises a series of reference colors surrounding the plurality of concentric rings.

12. The system of claim 4, wherein the template card further comprises a plurality of distinctive markings readable by the processor as part of the first image; and the processor is further configured to correct perspective distortion of the first image using the distinctive markings.

13. The system of claim 3, wherein the camera is part of a smartphone.

14. The system of claim 1, wherein the processor is part of a smartphone.

15. The system of claim 1, wherein the color definitions correspond to paint colors.

16. The system of claim 1, wherein the color definitions correspond to shades of skintone for matching cosmetic makeups to skintones.

17. The system of claim 1, wherein each of the color definitions corresponds to a color within the RGB color spectrum.

18. The system of claim 1, wherein intensity on the at least one reference scale is a function of geometric position on the template card.

19. The system of claim 2, wherein the template card further comprises a machine-readable code configured to provide the pre-determined calibration RGB values and the predetermined least squares fitting function.

20. The system of claim 19, wherein the machine-readable code is a bar code.

21. A method for matching colors, comprising:
  arranging a template card comprising at least one reference scale adjacent to a color sample of unknown color;
  obtaining a first image of the template card and the color sample;
  determining a sample RGB value of the color sample and at least one reference RGB value from the first image to produce a determined sample RGB value;
  applying color correction to the determined sample RGB value based on a difference between the at least one reference RGB value and corresponding calibration RGB values of the at least one reference scale to produce a color corrected sample RGB value, and
  comparing the color corrected sample RGB value with RGB values of a plurality of color definitions stored within a database to determine a color match.

22. The method of claim 21, further comprising applying a predetermined least squares fitting function to the color corrected RGB value prior to comparing the color corrected sample RGB value with the RGB values of the color definitions stored within the database.

23. The method of claim 21, wherein obtaining the first image comprises actuating a camera.

24. The method of claim 21, wherein the template card comprises a substrate and a cut-out, and wherein the arranging a template card comprises positioning the cut-out over the color sample.

25. The method of claim 24, wherein the reference scale comprises a modulated gray scale arranged on the substrate.

26. The method of claim 24, wherein the reference scale comprises a plurality of gray scales arranged on the substrate.

27. The method of claim 24, wherein the reference scale comprises a plurality of gray scales arranged on the substrate and modulated as a function of an angle of a polar coordinate.

28. The method of claim 24, wherein the reference scale comprises three gray scales arranged on the substrate and modulated as a function of an angle of a polar coordinate, and each of the gray scales being offset by 120 degrees with respect to each of the other two gray scales.

29. The method of claim 24, wherein the reference scale comprises a plurality of concentric rings arranged on the substrate around the cut-out, each of the concentric rings having offset gray scales modulated as a function of an angle of a polar coordinate, wherein there is a trigonometric relationship between the gray scales of the plurality of concentric rings.

30. The method of claim 29, wherein the reference scale further comprises at least one reference color arranged around the plurality of concentric rings.

31. The method of claim 30, wherein the at least one reference color comprises a series of reference colors surrounding the plurality of concentric rings.

32. The method of claim 24, wherein the template card further comprises a plurality of distinctive markings; and the method further comprising correcting a perspective distortion of the first image using the distinctive markings.

33. The method of claim 23, wherein the camera is part of a smartphone.

34. The method of claim 21, wherein the processor is part of a smartphone.

35. The method of claim 21, wherein the color definitions correspond to paint colors.

36. The method of claim 21, wherein the color definitions correspond to shades of skintone for matching cosmetic makeups to skintones.

37. The method of claim 21, wherein each of the color definitions corresponds to a color within the RGB color spectrum.

38. The method of claim 21, wherein intensity on the reference scale is a function of geometric position on the template card.

39. The method of claim 38, wherein determining a sample RGB value of the color sample from the first image comprises determining measured red, green and blue color values of the color sample and determining geometric positions on the template card where intensity on the reference scale matches each of the measured red, green and blue color values.

40. The method of claim 22, further comprising using a machine-readable code on the template card to obtain the calibration RGB values and the predetermined least squares fitting function.

41. The method of claim 40, wherein the machine-readable code is a bar code.

42. A system for color determination, comprising:
a database storing color definitions, each having a unique RGB value;
one or more template cards, each comprising at least one reference scale and at least one reference color; and
a processor configured to:
receive one or more images of the template cards and one or more known color samples,
process the images,
output known sample RGB values and at least one reference color RGB value,
store the at least one reference color RGB value as a calibration RGB value matrix for color correction,
compare the output known sample RGB values with the RGB values of corresponding color definitions stored within the database; and
perform a least squares fit of the output known sample RGB values to the corresponding color definition RGB values to generate coefficients of a transform function for transforming output RGB values into corresponding color definition RGB values.

43. The system of claim 42, wherein the processor is further configured to associate the calibration RGB value matrix and transform function coefficients with a machine-readable code on the template cards.

44. The system of claim 42, further comprising an image capturing device configured to capture the images.

45. A method for color determination, comprising:
obtaining one or more images of template cards and one or more known color samples,
outputting known sample RGB values and at least one reference color RGB value,
storing the at least one reference color RGB value as a calibration RGB value matrix for color correction,
comparing the output known sample RGB values with RGB values of corresponding color definitions stored within a database; and
performing a least squares fit of the output known sample RGB values to the corresponding color definition RGB values to generate coefficients of a transform function for transforming output RGB values into corresponding color definition RGB values.

46. The method of claim 45, further comprising associating the calibration RGB value matrix and transform function coefficients with a machine-readable code on the template cards.

47. The method of claim 45, wherein obtaining the images comprises actuating an image capturing device.

* * * * *